(12) United States Patent
Colline

(10) Patent No.: US 8,812,913 B2
(45) Date of Patent: Aug. 19, 2014

(54) METHOD AND APPARATUS FOR ISOLATING STORAGE DEVICES TO FACILITATE RELIABLE COMMUNICATION

(75) Inventor: Phillip Raymond Colline, Irvine, CA (US)

(73) Assignee: Dot Hill Systems Corporation, Longmont, CO (US)

( * ) Notice: Subject to any disclaimer, the term of this patent is extended or adjusted under 35 U.S.C. 154(b) by 459 days.

(21) Appl. No.: 13/242,089

(22) Filed: Sep. 23, 2011

(65) Prior Publication Data
US 2013/0080829 A1  Mar. 28, 2013

(51) Int. Cl.
*G06F 11/00* (2006.01)
*G06F 11/07* (2006.01)

(52) U.S. Cl.
CPC ........ *G06F 11/0727* (2013.01); *G06F 11/0793* (2013.01); *G06F 11/076* (2013.01)
USPC ............. 714/47.2; 714/43; 714/47.1; 714/55; 714/56

(58) Field of Classification Search
USPC ............................. 714/43, 47.1, 47.2, 55, 56
See application file for complete search history.

(56) References Cited

U.S. PATENT DOCUMENTS

| | | | | |
|---|---|---|---|---|
| 6,349,350 B1 * | 2/2002 | Hathorn et al. | | 710/36 |
| 6,952,734 B1 * | 10/2005 | Gunlock et al. | | 709/227 |
| 7,280,485 B2 * | 10/2007 | Suenaga | | 370/241 |
| 7,543,190 B2 * | 6/2009 | Walker | | 714/43 |
| 7,673,185 B2 * | 3/2010 | Kalwitz et al. | | 714/43 |
| 7,676,701 B2 * | 3/2010 | Kuroishi et al. | | 714/43 |
| 7,743,284 B1 * | 6/2010 | Taylor et al. | | 714/42 |
| 7,779,306 B1 * | 8/2010 | Philbin et al. | | 714/43 |
| 7,921,336 B1 * | 4/2011 | Booth et al. | | 714/48 |
| 8,060,650 B2 * | 11/2011 | Jansz et al. | | 709/244 |
| 8,156,382 B1 * | 4/2012 | Booth et al. | | 714/47.2 |
| 8,307,157 B2 * | 11/2012 | Sakuma et al. | | 711/114 |
| 8,407,527 B1 * | 3/2013 | Philbin et al. | | 714/43 |
| 8,458,527 B2 * | 6/2013 | Oldfield et al. | | 714/43 |
| 8,510,606 B2 * | 8/2013 | Wight et al. | | 714/43 |
| 8,560,878 B2 * | 10/2013 | Washiya et al. | | 714/5.11 |
| 2006/0107089 A1 * | 5/2006 | Jansz et al. | | 714/5 |
| 2008/0005620 A1 * | 1/2008 | Walker | | 714/43 |
| 2011/0191637 A1 * | 8/2011 | Wight et al. | | 714/43 |
| 2011/0320881 A1 * | 12/2011 | Dodson et al. | | 714/43 |
| 2012/0072772 A1 * | 3/2012 | Whitt et al. | | 714/32 |
| 2012/0246521 A1 * | 9/2012 | Washiya et al. | | 714/48 |

OTHER PUBLICATIONS

Specification T10/2125-D Revision 02, "Information Technology—Serial Attached SCSI—2.1 (SAS-2.1)", May 19, 2009.

\* cited by examiner

*Primary Examiner* — Joshua P Lottich
(74) *Attorney, Agent, or Firm* — Thomas J. Lavan

(57) ABSTRACT

A method for maintaining reliable communication on a link between an expander and a storage device is provided. The method includes detecting, by a processor coupled to the link, an error corresponding to the link, and maintaining a count of detected errors for the link, by the processor. The method also includes determining, by the processor, if the count of detected errors is above a first error threshold. If the count of detected errors is not above the first error threshold, then the method repeats the detecting, maintaining, and determining steps. If the count of detected errors is above the first error threshold, then the method provides the processor placing the storage device into a segregated zone.

17 Claims, 19 Drawing Sheets

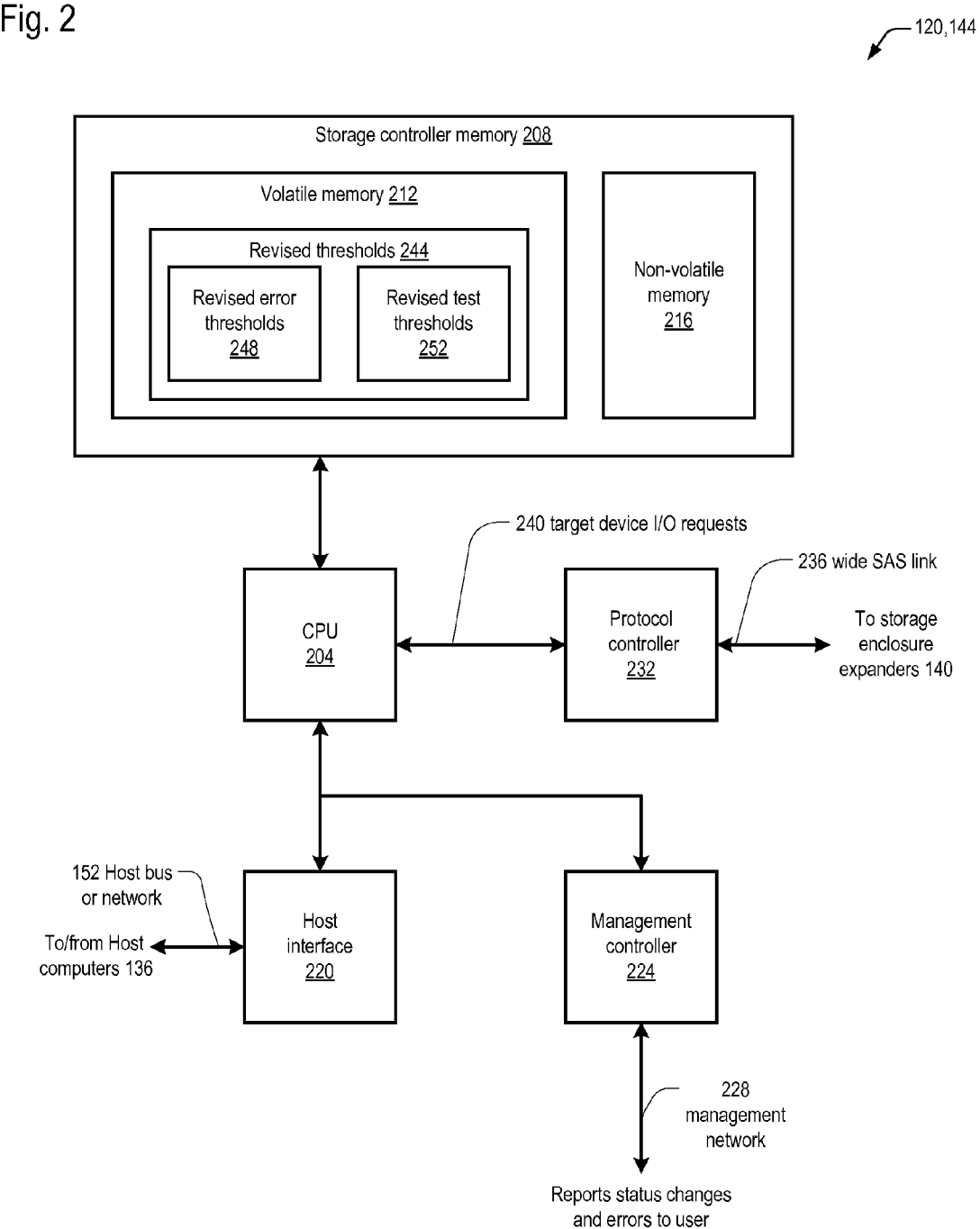

Fig. 6a    Expander controls segregated zones
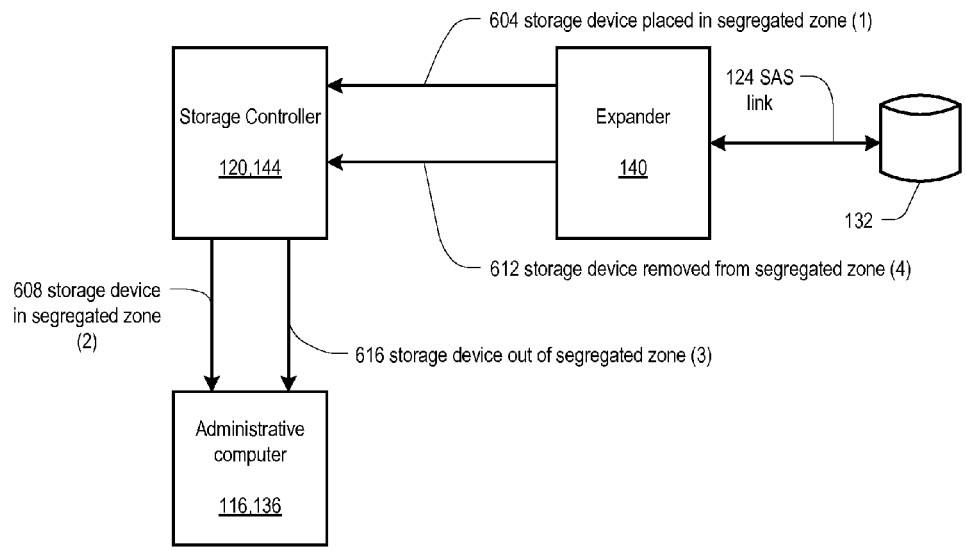
Fig. 6b   Expander controls segregated zones, with storage controller override
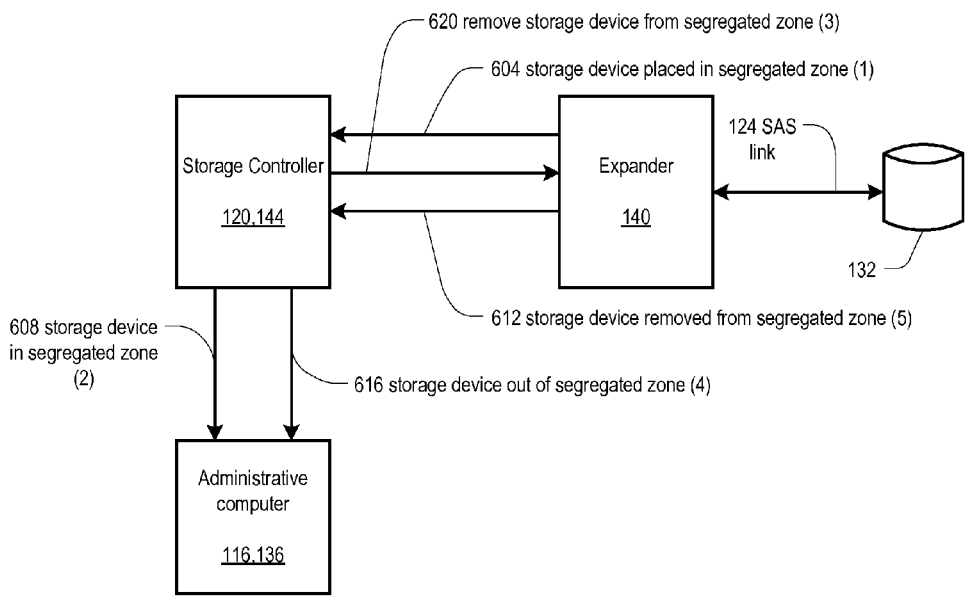

Fig. 6c Expander controls segregated zones, with administrative computer override
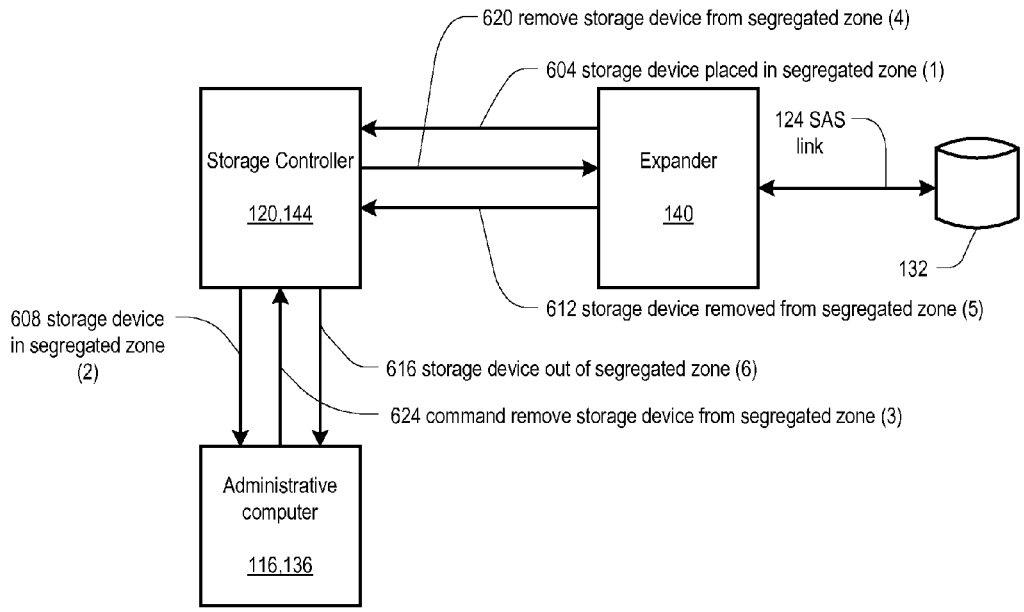
Fig. 6d Storage controller controls segregated zones
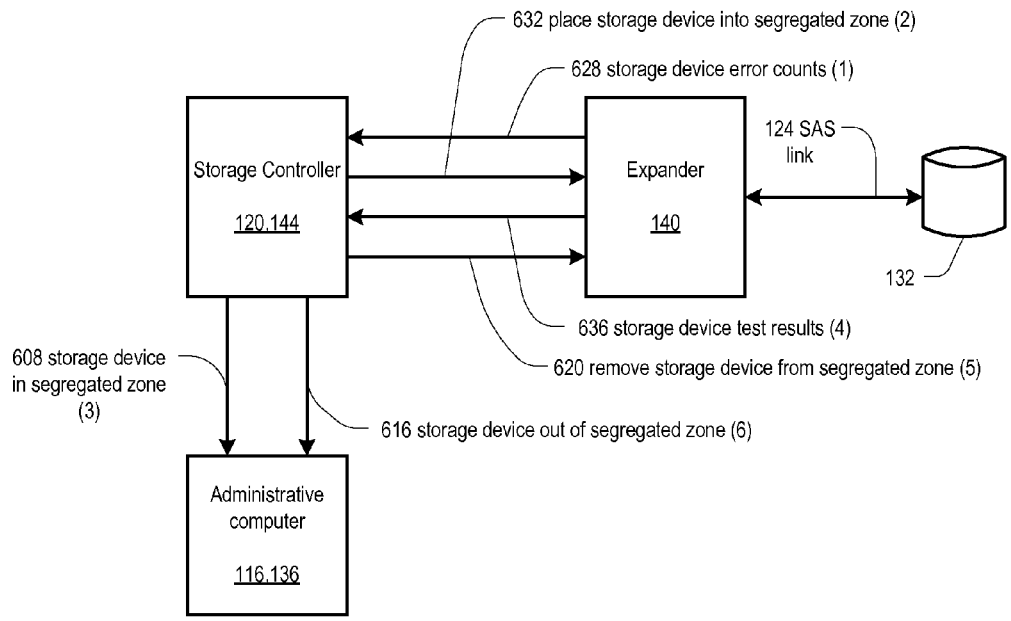

Fig. 6e  Storage controller controls segregated zones, with administrative computer override
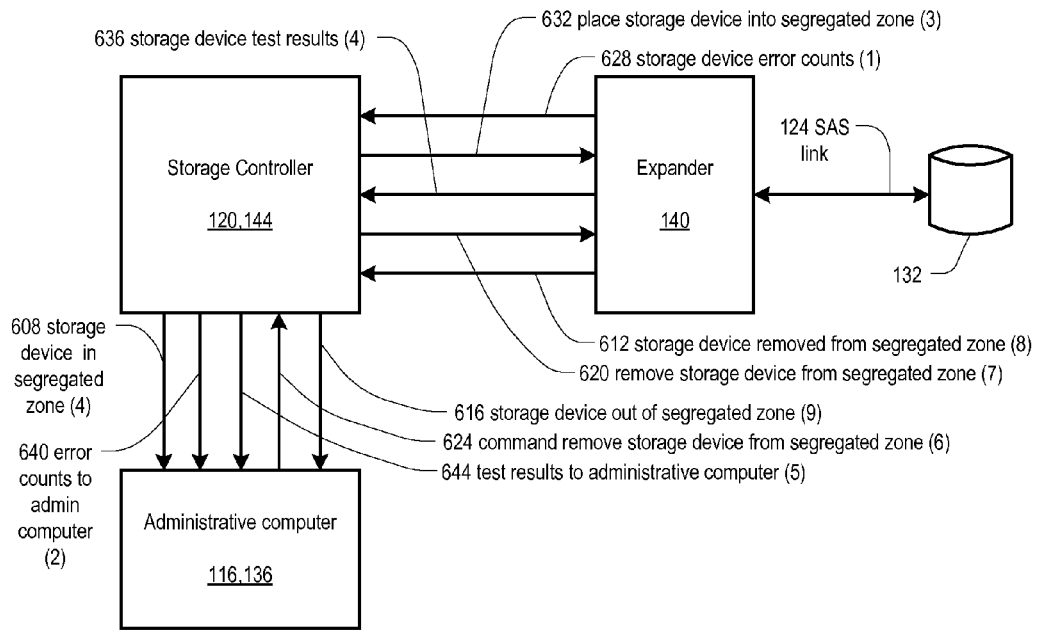
Fig. 6f  Administrative computer controls segregated zones
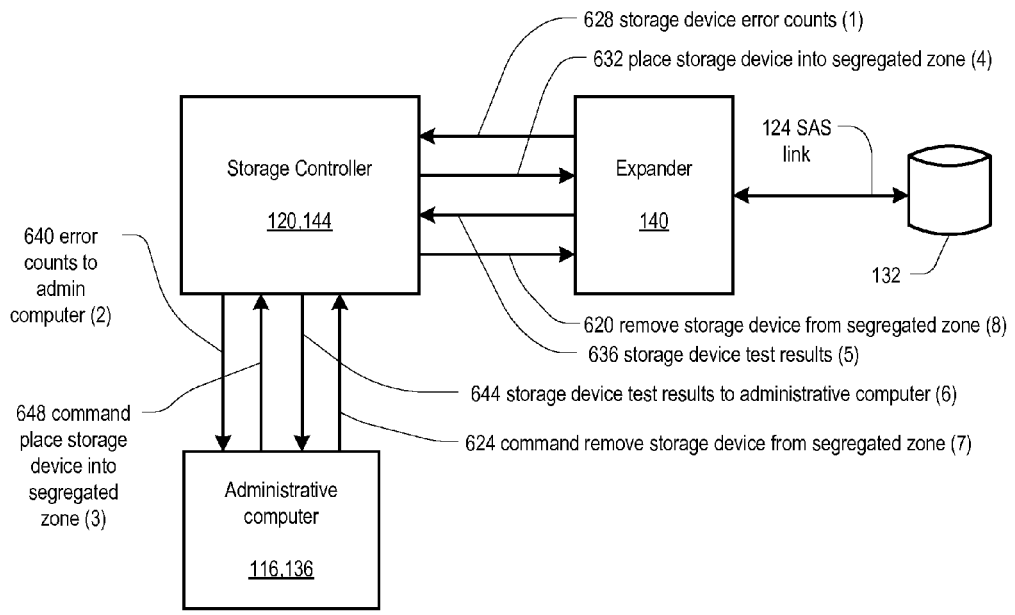

Fig. 7 Expander Initialization
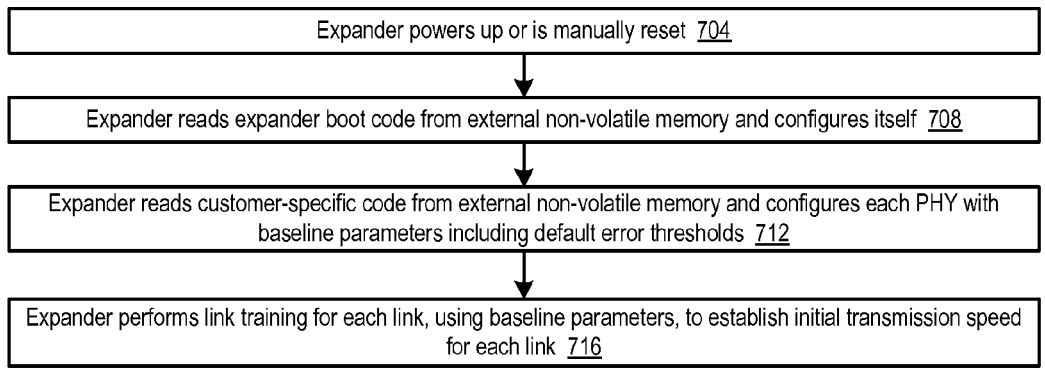

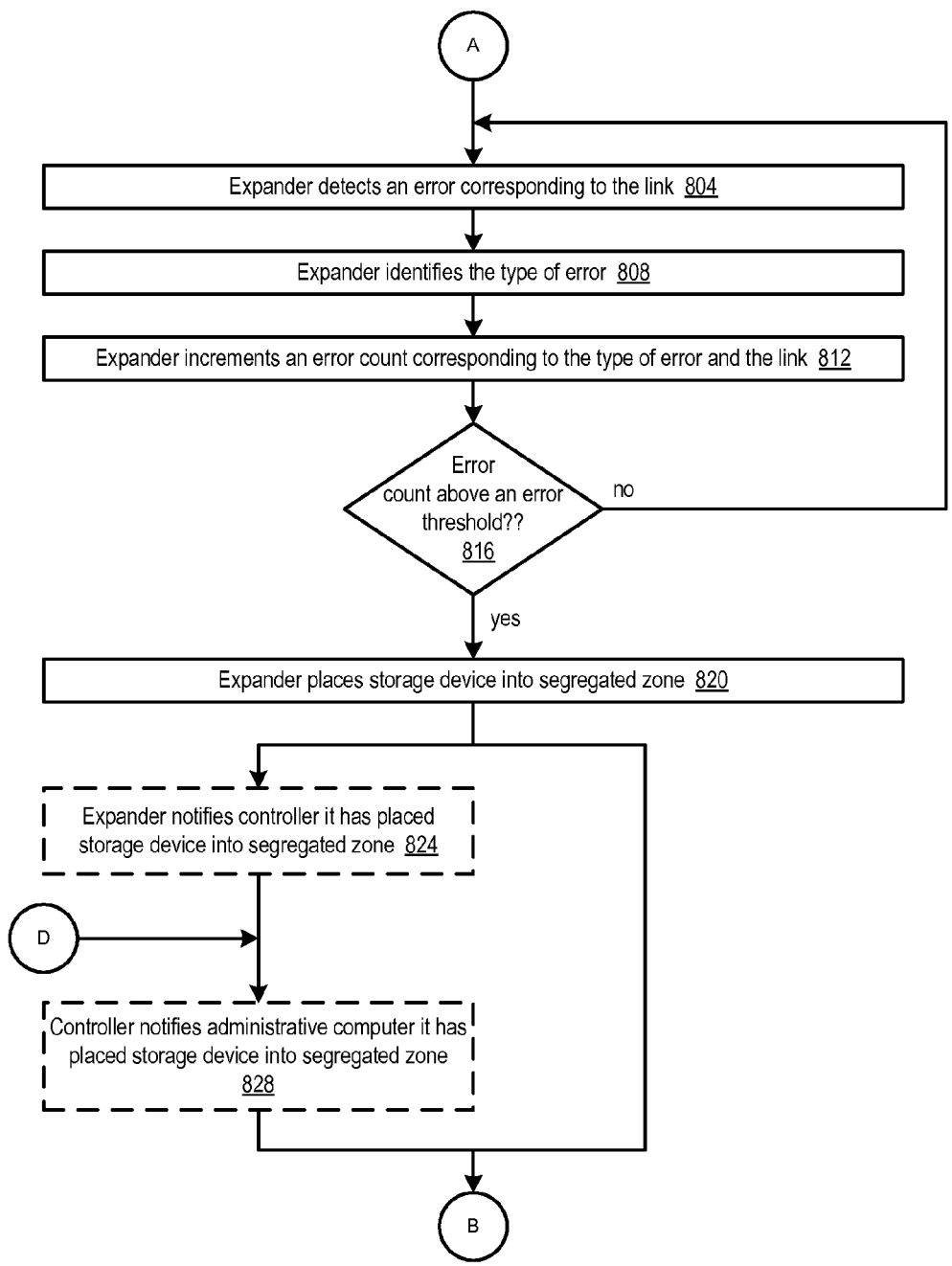
Fig. 8     Expander control of segregated zone

Fig. 9  Expander link testing
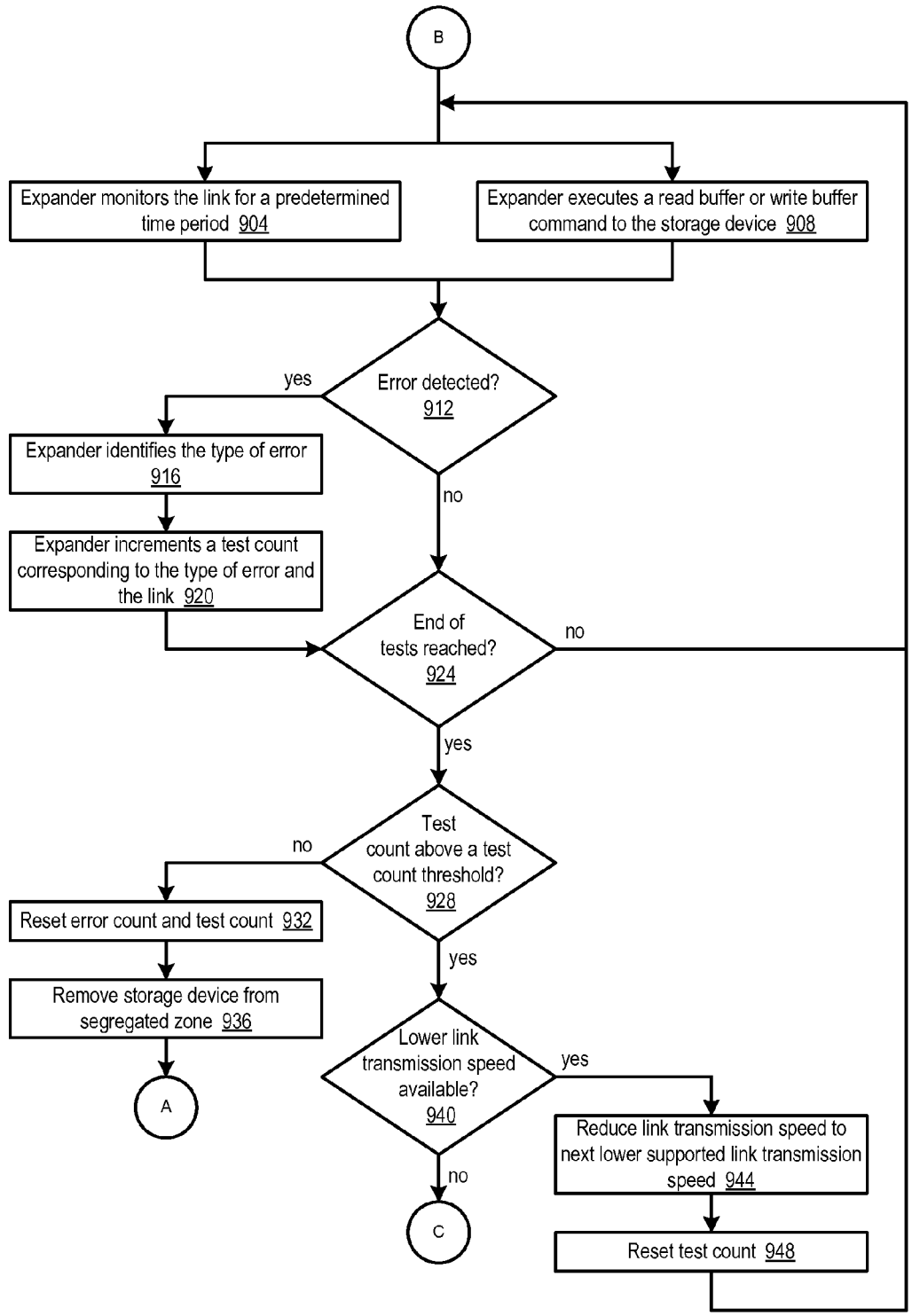

Fig. 10 Expander link testing failure
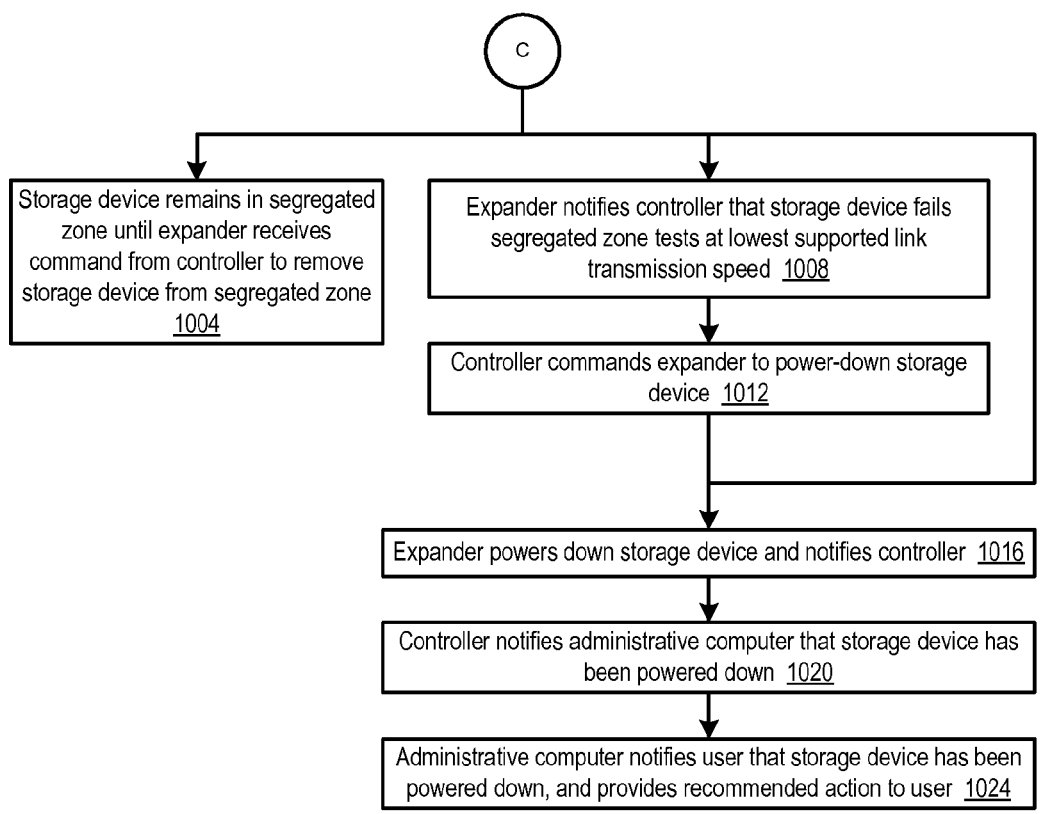

Fig. 11    Controller control of segregated zone
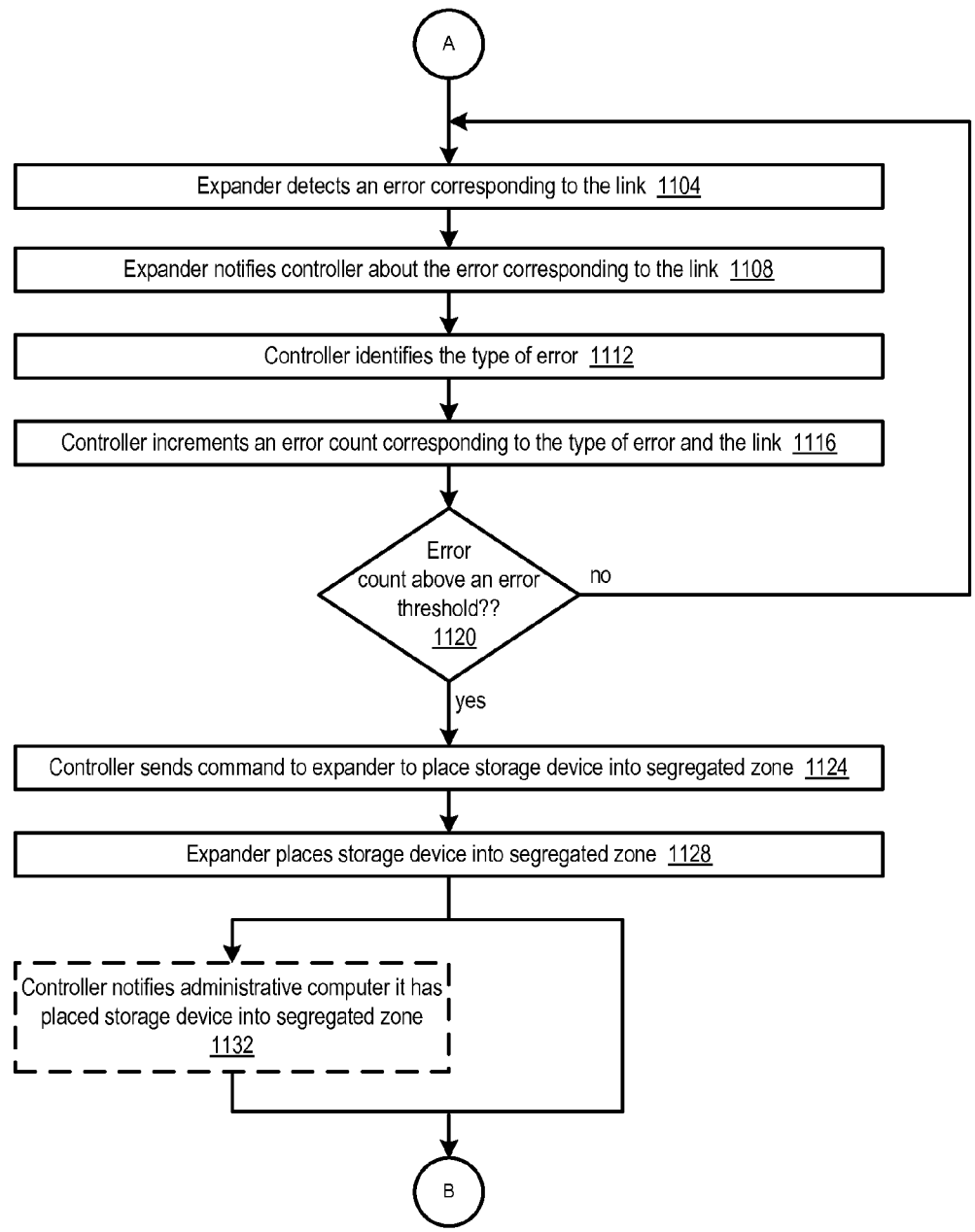

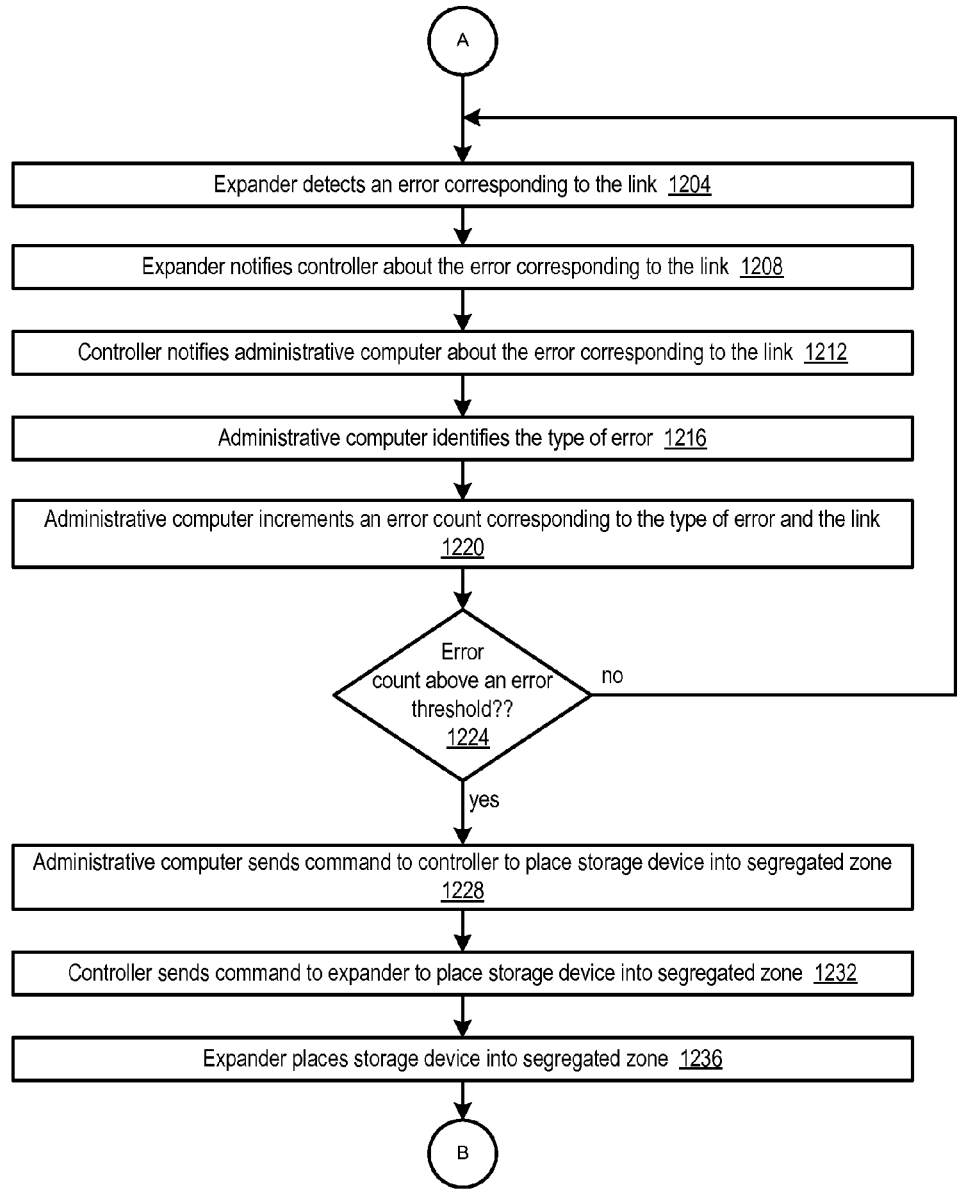
Fig. 12 Administrative computer control of segregated zone

Fig. 13a    Controller override of expander segregation
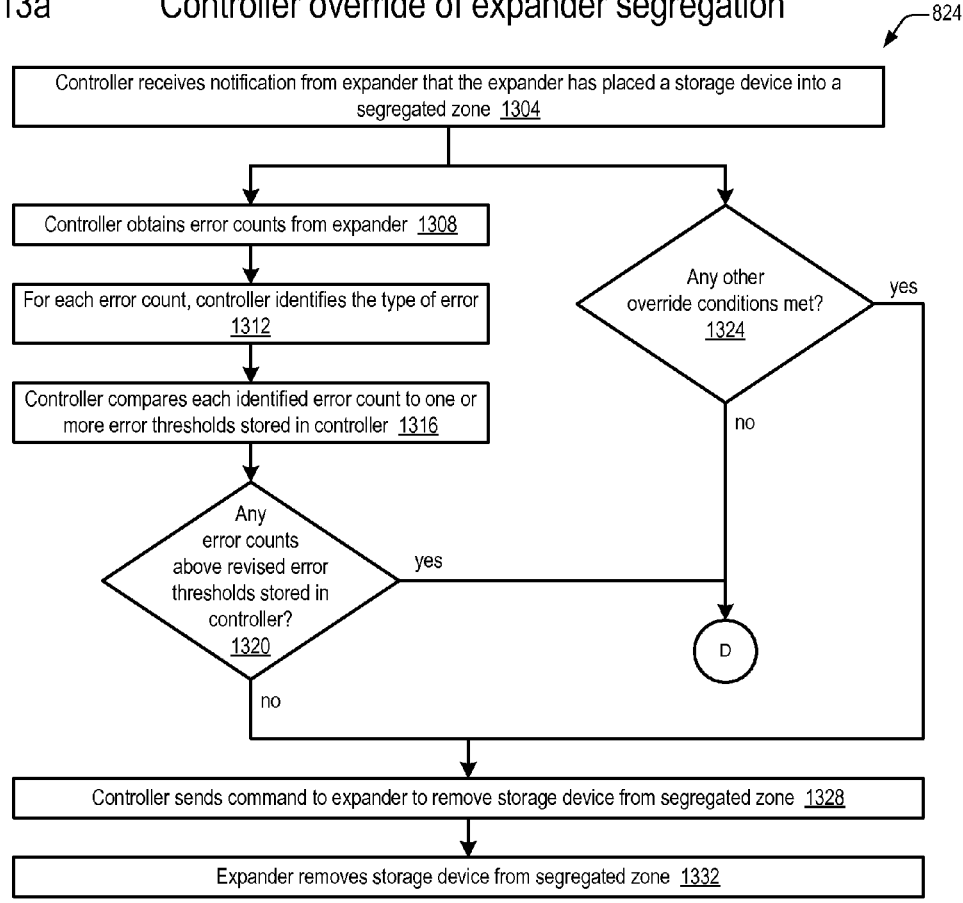
Fig. 13b    Controller segregation not based on error counts
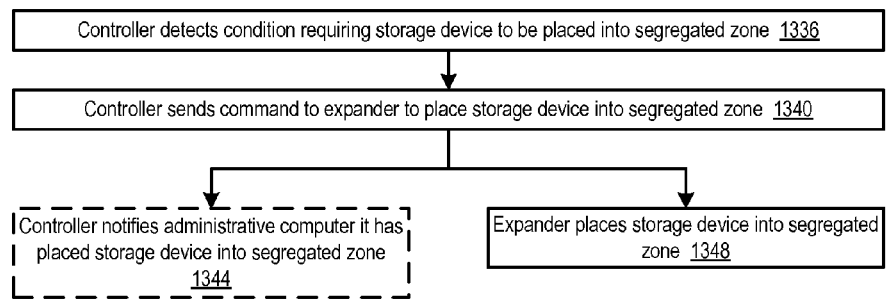

Fig. 14a Administrative computer override of expander segregation
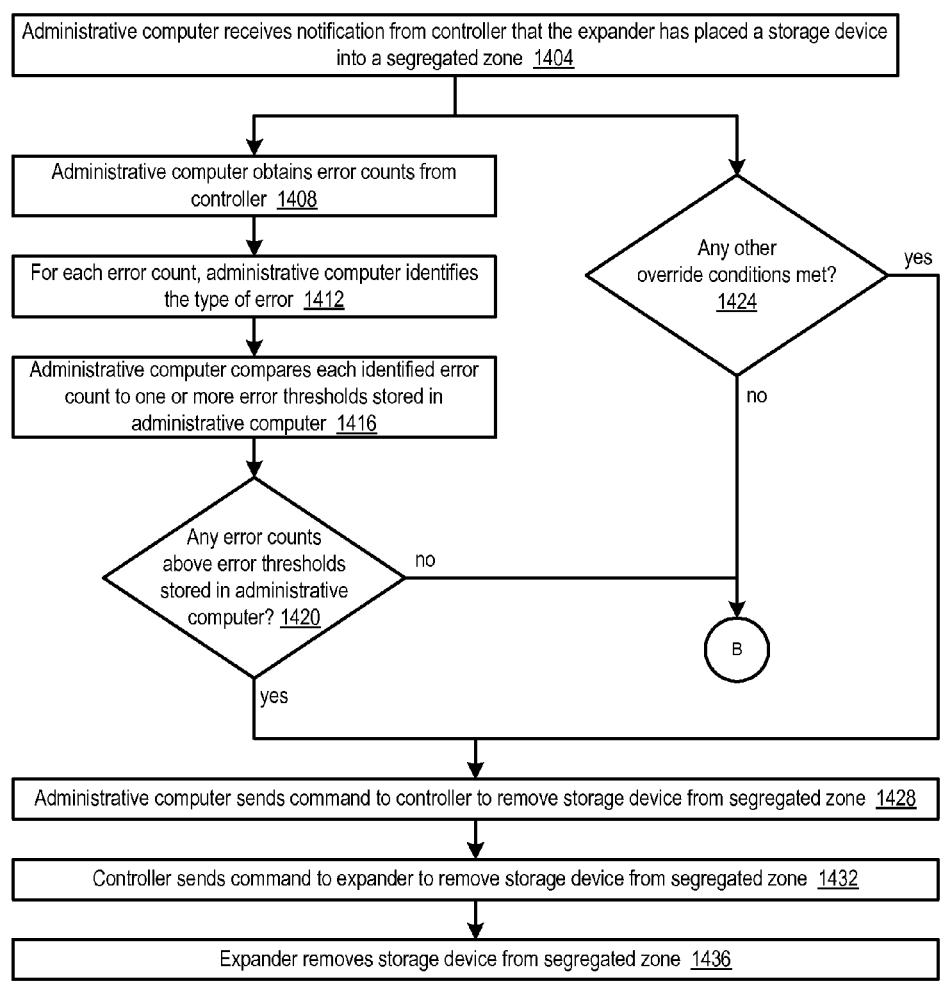

Fig. 14b  Administrative computer segregation not based on error counts
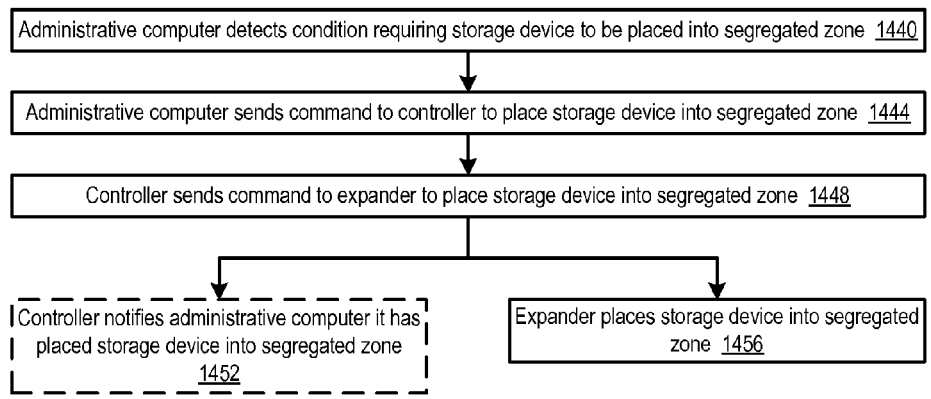

METHOD AND APPARATUS FOR ISOLATING STORAGE DEVICES TO FACILITATE RELIABLE COMMUNICATION

FIELD

The present invention is directed to computer data storage interfaces. In particular, the present invention is directed to methods and apparatuses for isolating storage devices and links between expanders and storage devices in order to facilitate reliable communication.

BACKGROUND

Serial-Attached-SCSI (SAS) systems are becoming more common in modern computing and data processing systems. SAS systems include SAS initiator devices and SAS target devices as does its parent, the Small Computer Systems Interface (SCSI). SAS target devices are typically storage devices, such as disk drives, that receive commands from SAS initiator devices, such as SAS host bus adapters in host computers or SAS I/O controllers in Redundant Arrays of Inexpensive Disks (RAID) controllers.

Implementations and uses of SAS are described in detail in the following documents, each of which is incorporated by reference in its entirety for all intents and purposes:
"Serial Attached SCSI—2.1 (SAS-2.1)", Revision 02, 19 May 2009. Working Draft, Project T1012125-D, American National Standard Institute.
"Information technology—SAS Protocol Layer (SPL)", Revision 02, 19 May 2009. Working Draft, Project T1012124-D, American National Standard Institute.

SAS systems are built on point-to-point serial connections between SAS devices. Each point-to-point connection is referred to as a link, and the two endpoints are individually referred to as a Physical Interface (PHY). A PHY contains a transmitter device (TX) and a receiver device (RX) and electrically interfaces to a link to communicate with another PHY at the other end of the link. The link includes two differential signal pairs; one pair in each direction. A SAS port includes one or more PHYs. A SAS port that has more than one PHY grouped together is referred to as a wide port, and the more than one link coupling the two wide ports are referred to as a wide link. Wide ports and wide links provide increased data transfer rates between SAS endpoints and enable multiple simultaneous connections to be open between a SAS initiator and multiple SAS targets.

The simplest SAS topology is a single SAS initiator having a SAS port that is connected by a single SAS link to a SAS port of a single SAS target. However, it is desirable in many applications, such as a high data availability RAID system, to enable one or more SAS initiators to communicate with multiple SAS target devices. In addition to initiators and targets, SAS includes a third type of device, expanders, which are employed in SAS systems to achieve more complex topologies. SAS expanders perform switch-like functions, such as routing, to enable SAS initiators and targets to communicate via the SAS point-to-point connections.

SUMMARY

The present invention is directed to solving disadvantages of the prior art. In accordance with embodiments of the present invention, a method for maintaining reliable communication on a link between an expander and a storage device is provided. The method includes detecting, by a processor coupled to the link, an error corresponding to the link, and maintaining, by the processor, a count of detected errors for the link. The method also includes determining, by the processor, if the count of detected errors is above a first error threshold. If the count of detected errors is not above the first error threshold, then the method repeats the detecting, maintaining, and determining steps. If the count of detected errors is above the first error threshold, then the method includes placing, by the processor, the storage device into a segregated zone.

In accordance with other embodiments of the present invention, a system for maintaining reliable communication on a link between an expander and a storage device is provided. The system includes a processor, a storage device, and a link, coupled to the processor and the storage device. The processor detects an error corresponding to the link, maintains a count of detected errors for the link, and determines if the count of detected errors is above a first error threshold. If the count of detected errors is not above the first error threshold, the processor repeats detects, maintains, and determines. If the count of detected errors is above the first error threshold, then the processor places the storage device into a segregated zone.

In accordance with still other embodiments of the present invention, a method for maintaining reliable communication on a link between an expander and a storage device is provided. The method includes detecting, by a processor coupled to the link, an error corresponding to the link, and providing, by the processor, an indication of the error corresponding to the link to a controller coupled to the processor. The method includes maintaining, by the controller, a count of detected errors for the link, and determining, by the controller, if the count of detected errors is above a first error threshold. If the count of detected errors is not above the first error threshold, then the method repeats detecting, providing, maintaining, and determining. If the count of detected errors is above the first error threshold, then the method includes transferring, by the controller, a command to the processor to place the storage device into a segregated zone, and placing, by the processor, the storage device into the segregated zone.

Advantages of the present invention include a method to restore communications to a SAS link when a storage device misbehaves and causes multiple, or even continuous, configuration changes. Configuration changes cause time-consuming device discovery processes to be initiated, which prevents normal I/O traffic over interconnected links while device discovery is taking place. By removing a misbehaving storage device from the active domain, further configuration changes are prevented and normal I/O traffic is allowed to resume among all interconnected links. Normal I/O traffic occurs as part of regular operation, when data reads and writes are allowed to storage devices, and storage devices participate in device discovery processes. Storage devices prevented from participating in regular operation are prohibited from participating in device discovery processes, and in most cases are not presented with data read or write operations unless the data read or write operations are specifically allowed as part of segregated zone testing.

Another advantage of the present invention is it is able to restore storage devices to operational status autonomously and with minimal disruption to the system as a whole. Testing is performed on segregated storage devices while the segregated devices are still interconnected to storage controllers. In some embodiments, the testing is performed automatically, and segregated storage devices may be restored to operational status without a need for user intervention or system disruption. This minimizes interruptions to busy system administrators, allowing a single system administrator to manage a greater number of resources.

Another advantage of the present invention is it is able to preserve proven system configurations by isolating unproven or unqualified storage devices when they are added to a data storage system. Even if no specific errors are found, the segregation mechanism allows one or more unqualified storage devices to be isolated and flagged to a user or system administrator. If necessary, the user or system administrator may override the segregation and force the data storage system to integrate the unqualified storage devices, such as may be required in an emergency or disaster situation.

Another advantage of the present invention is it is able to dynamically manage a pool of segregated storage devices. The pool may be any size, and storage devices may be added to the pool or removed from the pool at any time, depending on testing status and override conditions.

A final advantage of the present invention is it provides for hierarchical management of storage devices in data storage systems. Although many low-level functions may be performed by expanders and storage controllers, embodiments of the present invention allow for users or system administrators to exert the greatest level of control over any decisions made with respect to segregation or un-segregation of any storage device. In some embodiments, error counts and test results are provided to a system administrator, who then makes individual decisions about segregation or un-segregation. In other embodiments, segregation or un-segregation decisions made by storage controllers or expanders are provided to system administrators, who may then override those decisions based on their own knowledge and objectives.

Additional features and advantages of embodiments of the present invention will become more readily apparent from the following description, particularly when taken together with the accompanying drawings.

BRIEF DESCRIPTION OF THE DRAWINGS

FIG. 2 is a block diagram illustrating components of a storage controller in accordance with embodiments of the present invention.

FIG. 6a is a block diagram illustrating a data storage system using expander control in accordance with the preferred embodiment of the present invention.

FIG. 6b is a block diagram illustrating a data storage system using expander control with controller override in accordance with embodiments of the present invention.

FIG. 6c is a block diagram illustrating a data storage system using expander control with administrative computer override in accordance with embodiments of the present invention.

FIG. 6d is a block diagram illustrating a data storage system using storage controller control in accordance with embodiments of the present invention.

FIG. 6e is a block diagram illustrating a data storage system using storage controller control with administrative computer override in accordance with embodiments of the present invention.

FIG. 6f is a block diagram illustrating a data storage system using administrative computer control in accordance with embodiments of the present invention.

FIG. 7 is a flowchart illustrating expander initialization in accordance with embodiments of the present invention.

FIG. 8 is a flowchart illustrating expander control of a segregated zone in accordance with embodiments of the present invention.

FIG. 9 is a flowchart illustrating expander link testing in accordance with embodiments of the present invention.

FIG. 10 is a flowchart illustrating expander link testing failure in accordance with embodiments of the present invention.

FIG. 11 is a flowchart illustrating storage controller control of a segregated zone in accordance with embodiments of the present invention.

FIG. 12 is a flowchart illustrating administrative computer control of a segregated zone in accordance with embodiments of the present invention.

FIG. 13a is a flowchart illustrating storage controller override of expander segregation in accordance with embodiments of the present invention.

FIG. 13b is a flowchart illustrating storage controller segregation not based on error counts in accordance with embodiments of the present invention.

FIG. 14a is a flowchart illustrating administrative computer override of expander segregation in accordance with embodiments of the present invention.

FIG. 14b is a flowchart illustrating administrative computer segregation not based on error counts in accordance with embodiments of the present invention.

DETAILED DESCRIPTION

Figure 1A:
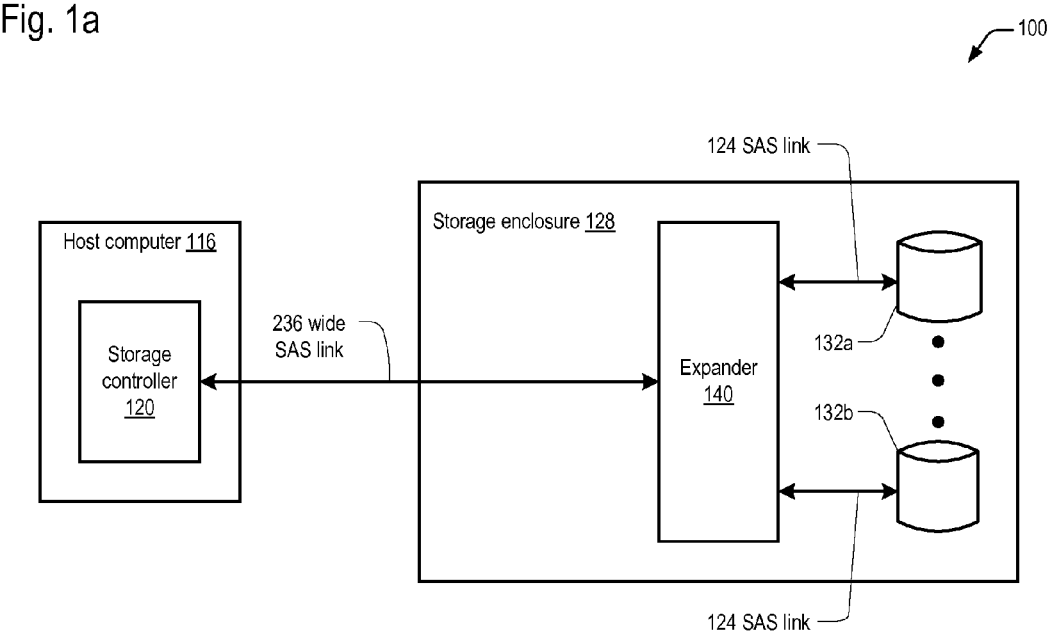
FIG. 1a is a block diagram illustrating components of a first electronic data storage system incorporating a data storage system in accordance with embodiments of the present invention.

The present inventors have observed various problems in complex topology systems having many paths between initiators and targets. Such systems include data storage systems having one or more storage controllers and many storage devices, and possibly two or more daisy-chained storage enclosures. Today, some link or storage device reliability problems have been observed with 6 Gigabit per second (Gb/s) SAS storage devices. Although Serial Attached SCSI (SAS) technology is currently limited to 6 Gb/s transfer rates, it is expected that SAS will have 12 Gb/s devices available in the near future. The present inventors observed higher transmission error rates at the faster transmission speeds, especially over the SAS link between an expander and a storage device. Transmission errors due to signal degradation often results in the need to resend commands multiple times, thereby causing delays and effectively reducing link bandwidth. In severe cases, a target device may stop responding altogether, resulting in inaccessible data. Such a loss may, for example, cause a Redundant Array of Inexpensive Disks (RAID) array to become critical even when no actual storage device failure has occurred, which then requires time-consuming data reconstruction. Other link failures have an intermittent nature, where a storage device behaves and responds normally at some times and not respond at other times. The latter behavior may cause the data storage system to initiate device discovery processes in order to determine exactly which devices are now connected. During the device discovery process, normal data I/O operations are suspended and the data storage system productivity is interrupted. Therefore, it is advantageous to prevent misbehaving storage devices from participating in device discovery operations.

Hard storage device failures require the failure to be detected, a user or system administrator to be notified, the storage device physically replaced, and the volume containing the failed storage device to be reconstructed. However, in cases where there is no storage device hard failure, it is advantageous to attempt to make a misbehaving storage device stable and continue to make use of the device. This saves system administrator time as well as returning a RAID storage volume to a fully operational state usually faster than replacing and rebuilding the storage device.

SAS specifications provide for link training in order to establish a link. Link training is a short series of data transfers between each transmitter and receiver across a link to determine if basic communication is possible on each SAS link, and is generally performed at power-up, after a detected topology change, or after manual reset of an initiator. Current solutions utilize a single set of PHY parameters for link training Typically, the link training PHY parameters are either an average of a known set of PHY parameters for various receivers, or the PHY parameters for a given receiver. However, neither is ideal since optimal parameters for a given receiver or target device are usually different than average PHY parameters or the parameters for a specific device if the actual receiver or target is different. Although SAS link training establishes if basic communication is possible, it is not an ongoing activity or establishes that reliable communication is possible on a link. Link training may possibly establish that basic communication is possible at a given transmission speed, but communicating at the given transmission speed may produce a higher than desired transmission error rate. Therefore, what is needed is a means to achieve ongoing reliable link communications between a transmitter and receiver, especially if communication conditions change between the transmitter and receiver.

Although the present invention is described with respect to SAS technology, it should be understood that the system and processes of the present invention apply to any such point-to-point interface storage device interface technology including Serial ATA (SATA).

Referring now to FIG. 1a, a block diagram illustrating components of a first electronic data storage system 100 incorporating a storage enclosure 128 in accordance with embodiments of the present invention is shown. The electronic data storage system 100 includes one or more host computers 116. Host computer 116 is generally a server, but could also be a desktop or mobile computer. Host computer 116 executes application programs that generate read and write requests to storage devices 132a, 132b. Host computer 116 includes one or more storage controllers 120, although only a single storage controller 120 is illustrated for clarity. In one embodiment, storage controller 120 is a host bus adapter. In another embodiment, storage controller 120 is a RAID controller. In yet another embodiment, storage controller 120 represents a pair of dual redundant RAID controllers. Storage controller 120 may either be integrated on the motherboard of host computer 116, or may be an add-in board or other form of assembly in host computer 116. Storage controller 120 is described in more detail with respect to FIG. 2. In one embodiment, host computer 116 executes the steps of the present invention assigned to an "administrative computer" illustrated in FIGS. 8-14b.

Figure 3:
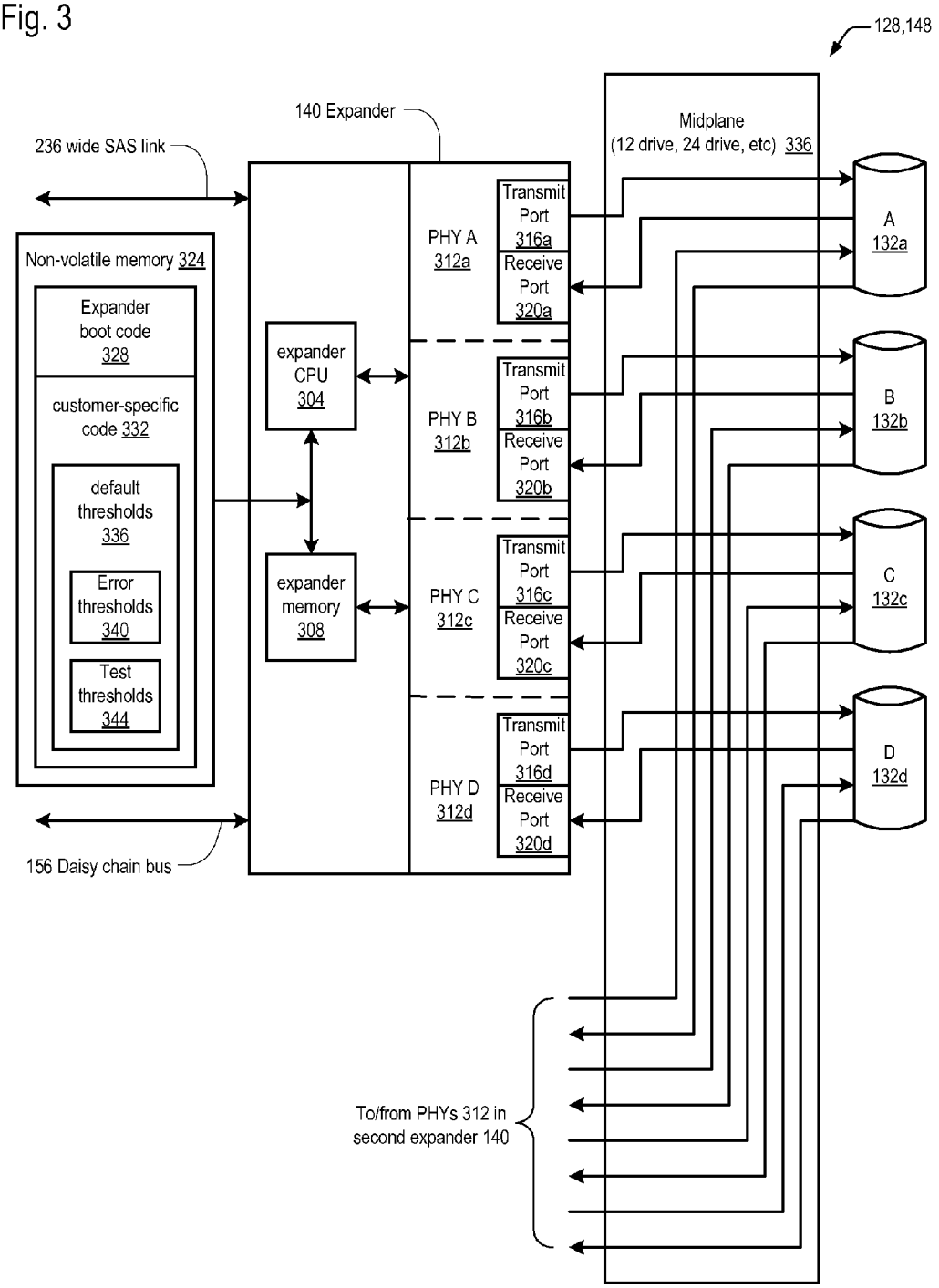
FIG. 3 is a block diagram illustrating components of a data storage system incorporating a storage enclosure in accordance with embodiments of the present invention.

Storage controller 120 transfers data to and from storage devices 132a, 132b in storage enclosure 128, over SAS links 124 and wide SAS link 236. In one embodiment, wide SAS link includes 4 SAS lanes. Storage enclosure 128 includes one or more SAS expanders 140, which perform switching functions, and transfers data and commands between storage controller 120 and storage devices 132a, 132b. In general, the transmit and receive paths of SAS links 124 to storage devices 132 are single lane SAS connections. However, in the future it is possible each transmit or receive path could be a multiple lane SAS link 124. Each SAS link 124 between SAS expander 140 and storage devices 132 includes separate transmit and receive paths, and each storage device 132 generally has two ports for independent interconnection to different SAS expanders 140 as illustrated in FIG. 3. Storage devices 132 are storage peripheral devices including, but not limited to hard disk drives, solid state drives, tape drives, and optical drives.

Figure 1B:
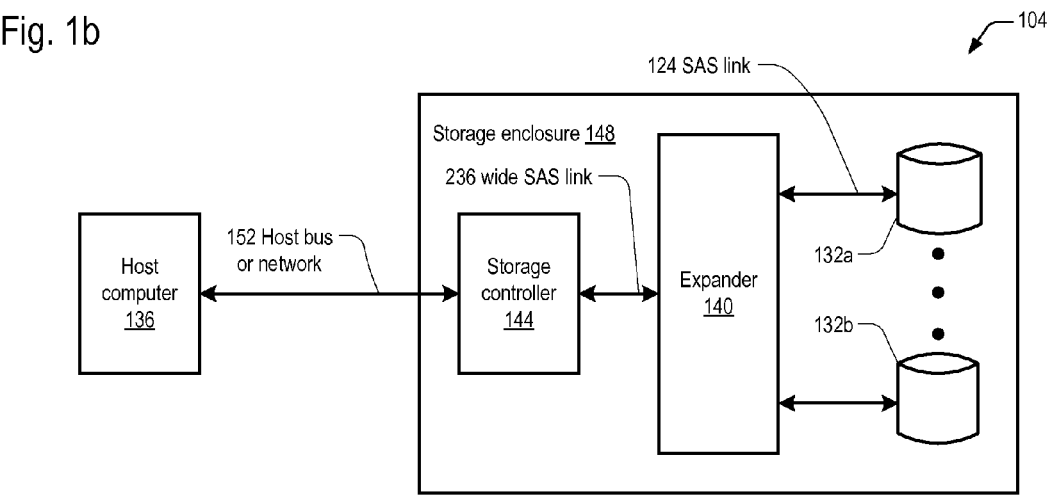
FIG. 1b is a block diagram illustrating components of a second electronic data storage system incorporating a data storage system in accordance with embodiments of the present invention.

Referring now to FIG. 1b, a block diagram illustrating components of a second electronic data storage system 104 incorporating a storage enclosure 148 in accordance with embodiments of the present invention is shown. Host computer 136 performs most of the functions previously described with respect to host computer 116, although the "controller" or "storage controller" functions of FIGS. 8-14b are instead performed by storage controller 144. Storage enclosure 148 is similar to storage enclosure 128, except that one or more storage controllers 144 are present. Storage controller 144 is described in more detail with respect to FIG. 2. In one embodiment, storage controller 144 is a RAID controller. In another embodiment, storage controller 144 represents a pair of dual redundant RAID controllers. Host computer 136 communicates with storage enclosure 148, including storage controller 144, over host bus or network 152. Host bus or network 152 is any suitable bus or network that allows high speed data transfer between host computer 136 and storage controller 144. Examples of host bus or network 152 include, but are not limited to, SCSI, Fibre Channel, SSA, SCSI, SAS, iSCSI, Ethernet, Infiniband, ESCON, ATM, and FICON. In some embodiments, host bus or network 152 is a storage area network (SAN).

Figure 1C:
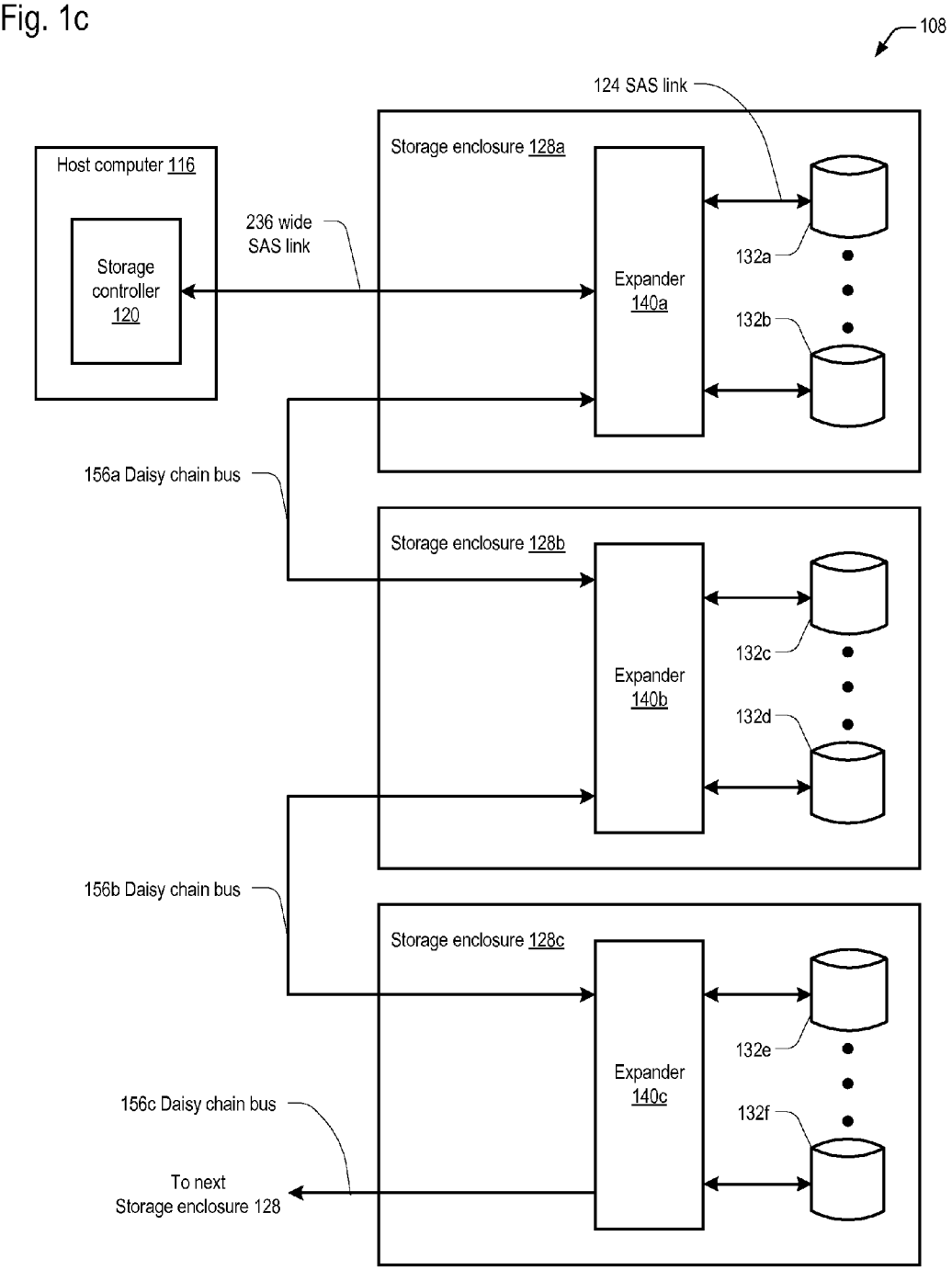
FIG. 1c is a block diagram illustrating components of a third electronic data storage system incorporating one or more data storage systems in accordance with embodiments of the present invention.

Referring now to FIG. 1c, a block diagram illustrating components of a third electronic data storage system 108 incorporating storage enclosures 128 in accordance with embodiments of the present invention is shown. Electronic data storage system 108 is similar to electronic data storage system 100 of FIG. 1a, but additional storage enclosures 128b, 128c are provided to support additional storage devices 132c, 132d, 132e, and 132f. In one embodiment, storage controller 120 is a host bus adapter. In another embodiment, storage controller 120 is a RAID controller. In yet another embodiment, storage controller 120 represents a pair of dual redundant RAID controllers. In order to support additional storage enclosures 128b, 128c, SAS expanders 140 utilize daisy chain buses 156. Daisy chain bus 156 utilizes the same protocol as SAS links 124, and is generally a SAS wide bus 236 having 4 SAS lanes. Daisy chain bus 156a interconnects SAS expander 140a and SAS expander 140b. Daisy chain bus 156b interconnects SAS expander 140b and SAS expander 140c. Daisy chain bus 156c interconnects SAS expander 140c and another storage enclosure 128, in a similar fashion to daisy chain buses 156a and 156b. In one embodiment, each storage enclosure 128 supports twelve storage devices 132 and each storage controller 120 supports up to 128 storage devices 132. However, in other embodiments each storage enclosure 128 may support more or fewer than 12 storage devices 132, and each storage controller 120 may support more or fewer than 128 storage devices 132.

Figure 1D:
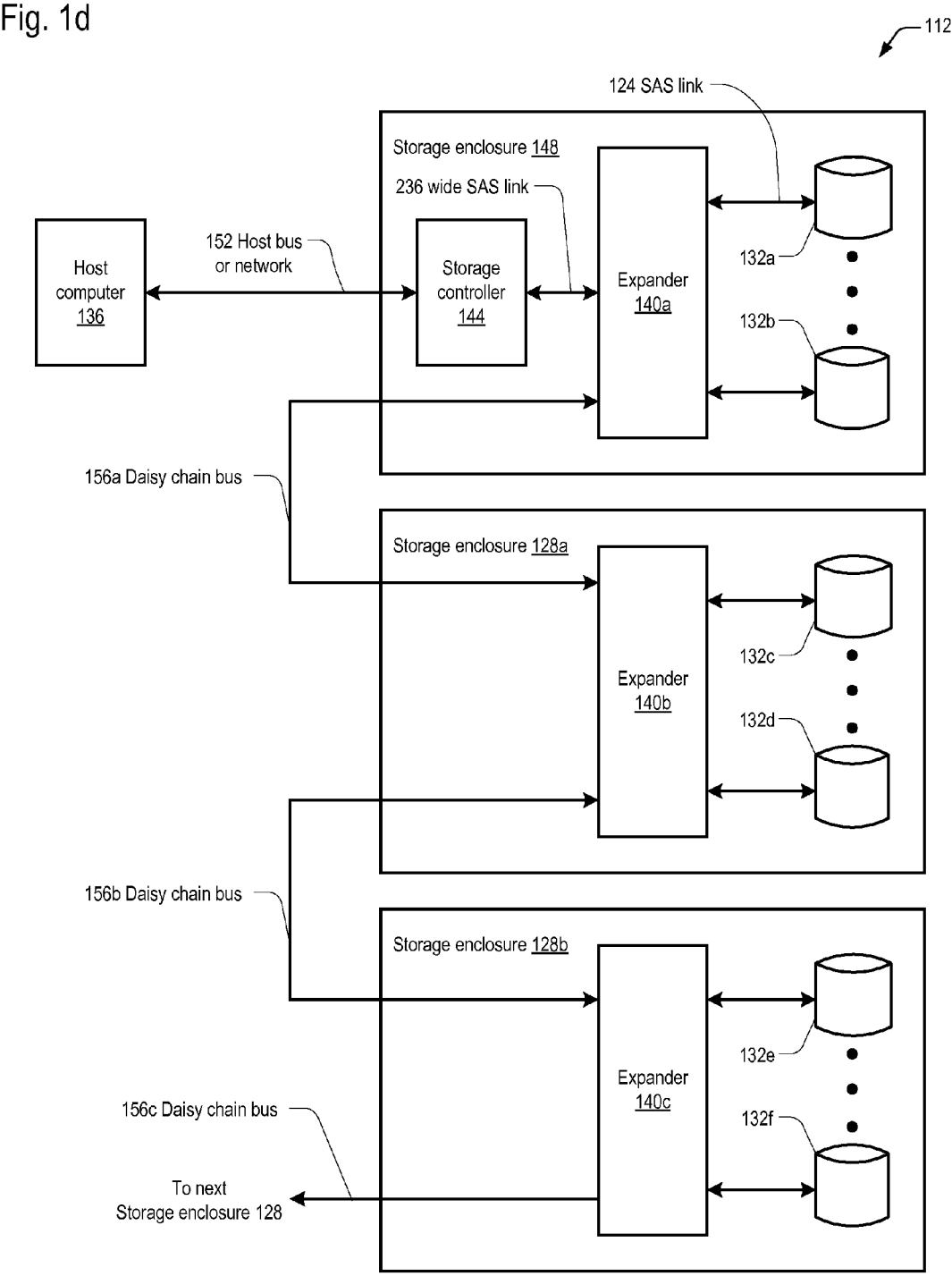
FIG. 1d is a block diagram illustrating components of a fourth electronic data storage system incorporating one or more data storage systems in accordance with embodiments of the present invention.

Referring now to FIG. 1d, a block diagram illustrating components of a fourth electronic data storage system 112 incorporating a storage enclosure 148 and multiple storage enclosures 128 in accordance with embodiments of the present invention is shown. Electronic data storage system 112 is similar to electronic data storage system 104 of FIG. 1b, but additional storage enclosures 128b, 128c are provided to support additional storage devices 132c, 132d, 132e, and 132f. In one embodiment, storage controller 144 is a RAID controller. In another embodiment, storage controller 144 represents a pair of dual redundant RAID controllers. In order to support additional storage enclosures 128a, 128b, SAS expanders 140 utilize daisy chain buses 156. Daisy chain bus 156 utilizes the same protocol as SAS links 124, and is generally a SAS wide bus 236 having 4 SAS lanes. Daisy chain bus 156a interconnects SAS expander 140a and SAS expander 140b. Daisy chain bus 156b interconnects SAS expander 140b and SAS expander 140c. Daisy chain bus 156c interconnects SAS expander 140c and another storage enclosure 128, in a similar fashion to daisy chain buses 156a and 156b. In one embodiment, each storage enclosure 128 supports twelve storage devices 132 and each storage controller 144 supports up to 128 storage devices 132. However, in other embodiments each storage enclosure 128 may support more or fewer than 12 storage devices 132, and each storage controller 144 may support more or fewer than 128 storage devices 132.

Referring now to FIG. 2, a block diagram illustrating components of a storage controller 120, 144 in accordance with embodiments of the present invention is shown. Although FIG. 2 illustrates key components of storage controller 120, 144 or controller, it should be noted that all components illustrated in FIG. 2, with the exception of host interface 220, are present in an administrative computer such as host computer 116 or 136. Storage controller 120, 144 includes a CPU 204, which executes stored programs that manage data transfers between host computers 116, 136 and storage devices 132. CPU 204 includes any processing device suitable for executing storage controller 120, 144 programs, such as Intel x86-compatible processors, embedded processors, mobile processors, field programmable gate arrays (FPGAs) with internal processors, and/or RISC processors. CPU 204 may include several devices including memory controllers, North Bridge devices, and/or South Bridge devices. Host computers 116, 136 generates read and write I/O requests over host bus or network 152 to host Interface 220. Multiple host computers 116, 136 may interact with storage controller 120, 144 over host bus or network 152.

CPU 204 is coupled to storage controller memory 208. Storage controller memory 208 includes both non-volatile memory 216 and volatile memory 212. The non-volatile memory 216 stores the program instructions that CPU 204 fetches and executes, including program instructions for the processes of FIGS. 8-10. Examples of non-volatile memory 216 include, but are not limited to, flash memory, SD, EPROM, EEPROM, hard disks, and NOVRAM. Volatile memory 212 stores various data structures and in some embodiments contains a read cache, a write cache, or both. Examples of volatile memory 212 include, but are not limited to, DDR RAM, DDR2 RAM, DDR3 RAM, and other forms of temporary memory.

In some embodiments, volatile memory 212 includes revised thresholds 244. Revised thresholds 244 include revised error thresholds 248, or first error thresholds, used for placing storage devices into segregated zones, and revised test thresholds 252, or second error thresholds, used for removing storage devices from segregated zones. In some embodiments, revised thresholds 244 are stored in non-volatile memory 216, or both volatile memory 212 and non-volatile memory 216. In some embodiments, expanders 140 provide error counts and/or test results to storage controller 120, 144, so that storage controller 120, 144 makes decisions about placing or removing storage devices 132 to or from segregated zones. In other embodiments, revised thresholds 244 allow storage controller 120, 144 to override segregation decisions made by expanders 140.

Storage controller 120, 144 may have one host interface 220, or multiple host interfaces 220. Storage controller 120, 144 has one or more protocol controller devices 232, which pass signals over one or more wide SAS links 236 to one or more expanders 140. In a preferred embodiment, protocol controller 232 is a SAS protocol controller 232. CPU 204 generates target device I/O requests 240 to protocol controller 232. In one embodiment, the protocol controller 232 is an LSI 2008 6 Gigabit per second (Gb/s) SAS controller and the expander 140 is a 36-port PMC PM8005 device. The electronic data storage systems 108, 112 may include multiple SAS paths 124, 236, 156 and multiple storage enclosures 128, 148.

Storage enclosures 128, 148 include a number of storage devices 132. In one embodiment, storage enclosures 128, 148 include up to twelve (12) storage devices 132. In another embodiment, storage enclosures 128, 148 include twenty-four (24) storage devices 132. However, the number of storage devices 132 may be less or more than twelve or twenty four. Multiple storage enclosures 128, 148 may be daisy chained with daisy chain buses 156a, 156b, 156c in order to increase the number of storage devices 132 controlled by storage controllers 120, 144.

Expanders 140a, 140b, and 140c transfer data, commands, and status to and from storage devices 132. In general, the transmit and receive paths to storage devices 132 are single lane SAS connections. However, in the future it is possible each transmit or receive path could be a multiple lane SAS connection, or some other form of connection.

Each storage controller 120, 144 also includes a Management controller 224. CPU 204 reports status changes and errors to the Management controller 224, which communicates status changes for storage controller 120, 144 and errors to one or more administrative computers 116, 136 over management network 228. Management controller 224 also receives commands from one or more administrative computers 116, 136 over management network 228. Management network 228 is any bus or network capable of transmitting and receiving data from a remote computer, and includes Ethernet, RS-232, Fibre Channel, ATM, SAS, SCSI, Infiniband, or any other communication medium. Such a communication medium may be either cabled or wireless. In some storage controllers 120, 144, status changes and errors are reported to an administrative computer 116, 136 through host interface 220 over host bus or network 152.

As can be seen in FIG. 1c or 1d, there may be many links between endpoints. For example, in FIG. 1d, storage controller 144 may transmit an I/O request to storage device 132e. This requires a transfer from protocol controller 232 through expander 140a over a wide SAS link 236, across daisy chain bus 156a, SAS expander 140b, daisy chain bus 156b, SAS expander 140c to disk 132e in storage enclosure 128b.

Referring now to FIG. 3, a block diagram illustrating components of a storage enclosure 128, 148 in accordance with embodiments of the present invention is shown. In the case of a storage enclosure 148, storage controller(s) 144 are not illustrated in FIG. 3 for simplicity. However, it should be understood that storage controller(s) 120, 144 interconnect to expander 140 through wide SAS link 236, as shown in FIGS. 1b and 1d. A system may utilize the present invention on the various SAS links between expanders 140 and storage devices 132, resulting in system-level link reliability improvements. Although a protocol controller 232 of a storage controller 120, 144 is the initiator for any I/O request addressed to a specific target device 132, the SAS signals pass through at least one expander 140.

The storage enclosure 128, 148 of FIG. 3 includes a plurality of storage devices 132 interconnected to one or more expanders 140 through a midplane 336, which may be designed to support a given number of storage devices 132. Protocol controller 232 is the initiator, and storage devices 132 are target devices. In one embodiment, the midplane 336 supports 12 storage devices 132. In another embodiment, the midplane 336 supports 24 storage devices 132. The storage devices 132 are typically individually hot-pluggable to aid in quick field replacement, in conjunction with RAID or redundant storage arrangements. For simplicity, only four storage devices 132a-132d are shown, with each storage device 132 having a separate transmit and receive path to the midplane 336. Storage devices 132 are typically dual-ported, with two sets of transmit and receive paths to expander PHYs 312. However, only one transmit and receive path is shown interconnected to expander PHYs 312 for each storage device 132 for simplicity. Storage devices 132 may have any number of ports, from one to four or more.

Expander 140 includes an expander CPU 304, or processor, and expander memory 308, and multiple physical interfaces or PHYs 312a-312d. Each PHY 312 has a transmit port 316 and a receive port 320. Each PHY 312 is therefore coupled to a different port of a storage device 132 through the midplane 336. For example, transmit port 316c and receive port 320c of PHY 312c are coupled to storage device 132c. Connections to storage devices 132 typically have only a single SAS lane per port, with dual ports as shown.

Storage enclosure 128, 148 has a non-volatile memory 324 coupled to expander 140. Examples of non-volatile memory 324 include, but are not limited to, flash memory, SD, compact flash, EPROM, EEPROM, and NOVRAM. The non-volatile memory 324 stores program instructions that are executed by the expander CPU 304 of expander 140. The program instructions are organized as expander boot code 328 and customer-specific code 332. The expander boot code 328 consists of program instructions to internally configure the expander 140 and boot-time diagnostics to make sure the expander 140 is internally operational. The customer-specific boot code 332 consists of program instructions that initially configure PHY 312 parameters and perform the expander 140 process steps of FIGS. 7-14b. The expander 140 functions after power-on by reading expander boot code 328 and customer-specific code 332 into expander memory 308. Once both sets of code are stored in expander memory 308, expander CPU 304 first executes the expander boot code 328 followed by the customer-specific code 332. The controller process steps of FIGS. 7-14b are executed by CPU 204 of storage controller 120, 144, and the administrative computer process steps of FIGS. 7-14b are executed by CPU 204 of administrative computer 116 or 136.

Customer-specific code 332 includes default thresholds 336. Default thresholds 336 include error thresholds 340, or first error thresholds, used for placing storage devices into segregated zones, and test thresholds 344, or second error thresholds, used for removing storage devices 132 from segregated zones. Default thresholds 336 are loaded into the expander 140 at boot time. The customer-specific code 332 is field upgradable, allowing a storage controller 120, 144 to upgrade anything in the customer-specific code 332, including default thresholds 336. Therefore, default thresholds 336 may be changed in order to take into account additional testing, new types of storage devices 132, or the frequency of segregating/un-segregating individual storage devices 132.

Each of the individual links between a PHY port 316, 320 and a storage device 132 has different routing through semiconductor devices, cables, connectors, PCB traces and so on. Therefore, path lengths and electrical characteristics will vary between links. In addition to path length variations, other factors affect electrical performance of links. Manufacturing differences between components, connector fit variances, PCB trace impedance, and inconsistent PCB routing contribute to electrical differences between paths. When a component is marginal or goes bad, such as a SAS device that generates logical errors, it may be caused by improper PHY analog settings, a bad or marginal PHY, or a bad or marginal link, which may include bad or marginal cables, connectors, or printed circuit board assembly traces. Some of the manifestations of the faulty components include intermittent communication errors between SAS devices, spurious transmit errors, or complete loss of a SAS link. Another manifestation is the inability for a SAS initiator to see a SAS target in the topology due to intermittent failures that cause a SAS device to work sufficiently well to be allowed into the topology, but to be sufficiently faulty to prevent effective communication between SAS devices. These problems are exacerbated at higher SAS transfer speeds. For example, today SAS devices support transfer rates of 1.5, 3, or 6 Gb/s. Soon, devices will be available that can support up to 12 Gb/s transfer rates. Transfer rates beyond 12 Gb/s are expected to be achievable in the future.

One method of dealing with errors due to signal integrity problems between expanders 140 and storage devices 132 is to attempt to identify the faulty component and send a command through either the SAS domain or other bus such as an Inter-Integrated Circuit ($I^2C$) or Universal Asynchronous Receiver/Transmitter (UART) bus to disable, or bypass, various PHYs 312 in the domain in a trial-and-error approach until the initiator has isolated the problem. However, some failure scenarios cannot be satisfactorily remedied by this approach. For example, assume a component fails in an intermittent fashion, such as a marginal PHY 312, that causes an expander 140 to first detect that a SAS link is operating properly, to subsequently detect that the link is not operating properly, and to continue this sequence for a relatively long time. According to the SAS standard, the expander 140 is required to transmit a BROADCAST primitive on each of its SAS ports to notify other SAS devices of the change of status within the SAS domain. Each time a SAS initiator receives the BROADCAST primitive it is required to perform a SAS discover process to discover the device type, SAS address, and supported protocols of each SAS device in the SAS domain and to configure routing tables within the expanders 140 as needed. The SAS discover process can take a relatively large amount of time to complete. If an expander 140 transmits BROADCAST primitives due to the operational-to-non-operational link transitions according to a period that is comparable to the SAS discover process time, then consequently the SAS initiator may be unable to effectively send commands though the SAS domain to identify and remedy the problem. Even if the initiator is successful in identifying and fixing the problem, the SAS domain may have been effectively unavailable for providing user data transfers for an unacceptable length of time.

Another potential problem in SAS systems is the fact that the SAS standard allows cables that connect SAS PHYs 312 to be anywhere within a relatively large range of lengths. For example, the SAS specification currently allow for cable lengths up to eight meters. The length of the SAS cable may significantly impact the quality of the signals received on the SAS link between two SAS PHYs 312. The present invention provides a solution to improve the data availability in SAS systems, which are subject to the foregoing problems.

Figure 4:
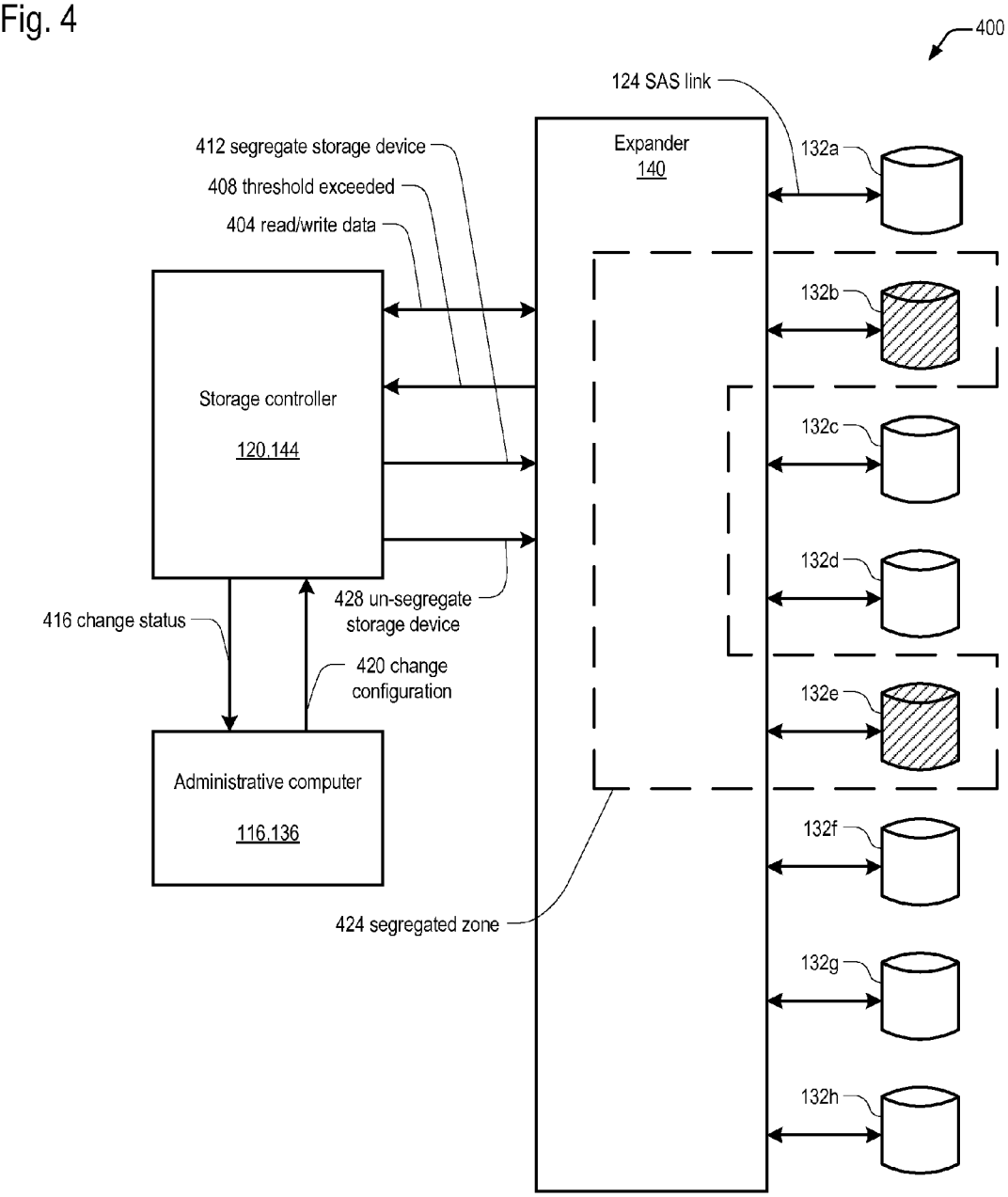
FIG. 4 is a block diagram illustrating a data storage system incorporating a segregated zone in accordance with embodiments of the present invention.

Referring now to FIG. 4, a block diagram illustrating a data storage system 400 incorporating a segregated zone 424 in accordance with embodiments of the present invention is shown. Although a single segregated zone 424 is illustrated in FIG. 4, it should be understood that any number of segregated zones 424 may be included in the present invention.

Data storage system 400 includes one expander 140 and eight connected storage devices 132, designated storage device 132a through 132h. Storage devices 132b and 132e are in segregated zone 424, with the other six storage devices 132 are un-segregated. Expander 140 is coupled to storage controller 120, 144, and read/write data 404 is transferred between storage controller 120, 144 and expander 140. Storage controller 120, 144 in some embodiments is coupled to one or more administrative computers 116, 136.

In some embodiments, expander 140 and generates a threshold exceeded 408 indication to storage controller 120, 144. This indicates to the storage controller 120, 144 that expander 140 has detected a number of errors associated with a storage device 132 that exceed default thresholds 336.

In response to receiving threshold exceeded 408, storage controller 120, 144 generates a segregate storage device 412 indication to the expander 140. This causes expander 140 to segregate the storage device 132 corresponding to threshold exceeded 408, for example storage device 132e. When a storage device 132 is segregated, read/write data 404 is suspended to and from the storage device 132, and the expander 140 prevents the storage device 132 from participating in device discovery processes.

At the same time, or after storage controller 120, 144 generates segregate storage device 412 to expander 140, storage controller 120, 144 generates change status 416 to one or more administrative computers 116, 136. Change status 416 informs the administrative computer, or a user/system administrator using the administrative computer 116, 136 that a storage device 132 has been segregated and placed into segregated zone 424. In some embodiments, administrative computer 116, 136 or a user/system administrator using the administrative computer 116, 136 decides to override the segregation decision made by storage controller 120, 144. An override decision may be made if the data storage system 400 cannot tolerate another storage device 132 being taken off-line and placed into segregated zone 424. For example, if storage devices 132a-132h represent an eight drive RAID 5 volume, and storage device 132b is already in the segregated zone 424, placing storage device 132e into segregated zone 424 results in taking two storage devices 132 off-line in a RAID volume that can only tolerate one storage device 132 failure or off-line at a time. Such action will result in loss of data, or at least an inability to access the RAID volume represented by storage devices 132a-132h. Therefore, a user or management program associated with administrative computer 116, 136 may recognize this condition and prevent a second storage device 132e from being taken off-line. Administrative computer 116, 136 prevents taking storage device 132e off-line by generating change configuration 420 to storage controller 120, 144. In response to receiving change configuration 420 from administrative computer 116, 136, storage controller 120, 144 generates un-segregate storage device 428 to expander 140. Un-segregate storage device 428 causes expander 140 to remove storage device 132e from segregated zone 424. Many other embodiments are possible between the expander 140, storage controller 120, 144, and administrative computer 116, 136. Several of the embodiments are illustrated in FIGS. 6a-6f.

Figure 5:
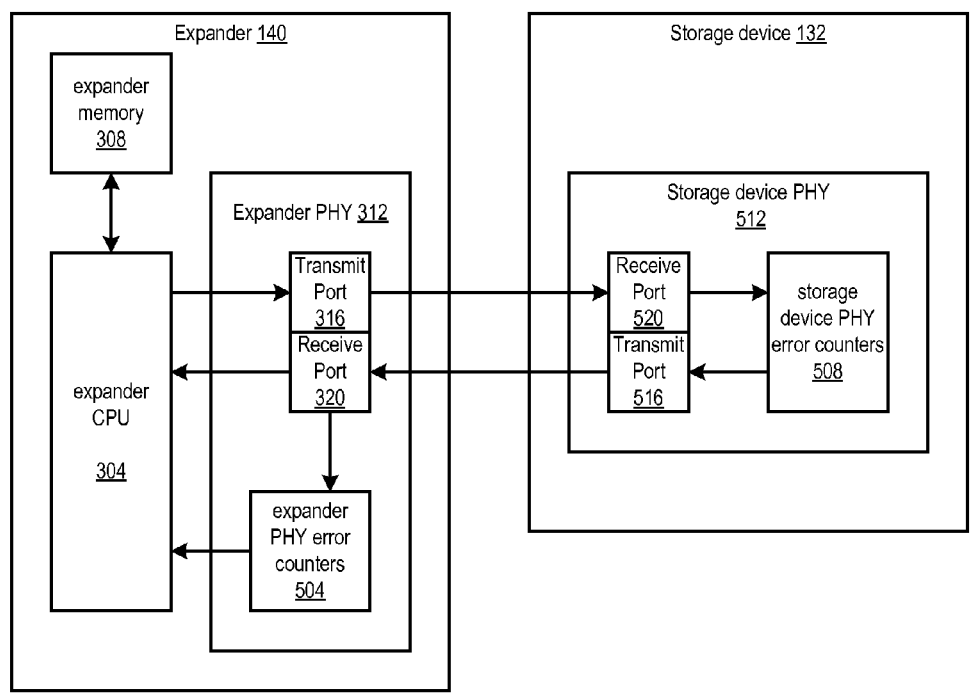
FIG. 5 is a block diagram illustrating PHY error counters for a bidirectional link between an expander and a storage device in accordance with embodiments of the present invention.

Referring now to FIG. 5, a block diagram illustrating PHY error counters 504, 508 for a bidirectional link between an expander 140 and a storage device 132 in accordance with embodiments of the present invention is shown. PHY error counters 504, 508 maintain running counts of errors associated with storage device 132 or the link between expander 140 and storage device 132. Although the type of counters provided in expander 140 and storage device 132 may differ or change in newer components, examples of error counters commonly provided in PHY error counters 504, 508 include invalid DWORD count, disparity error count, loss of DWORD synchronization count, PHY reset problem count, and code violation count.

As described previously with respect to FIGS. 1a-1d and FIG. 3, bidirectional links between expander 140 and storage device 132 utilize a single lane consisting of a transmit path from the expander 140 to the storage device 132, and a receive path from the storage device 132 to the expander 140. Storage device 132 includes a storage device PHY 512, which has a receive port 520, a transmit port 516, and storage device PHY error counters 508. Expander CPU 304 is able to read the storage device PHY error counters 508 over the bidirectional link, and temporarily store the current storage device PHY error counts in expander memory 308. Expander PHY 312 includes expander PHY error counters 504, which maintain error counts associated with receive frames through receive port 320. Expander CPU 304 reads expander PHY error counters 504, and temporarily stores the current expander PHY error counts in expander memory 308. Either expander PHY error counters 504 or storage device PHY error counters 508, or both, produce a count of detected errors for the link. In some embodiments, expander CPU 304 compares the storage device PHY error counts and expander PHY error counts to default thresholds 336 in order to determine if storage device 132 should be placed in a segregated zone.

Referring now to FIG. 6a, a block diagram illustrating a data storage system using expander 140 control in accordance with the preferred embodiment of the present invention is shown. Expander 140 control is where expander 140 makes decisions to segregate or un-segregate a given storage device 132.

Expander 140 determines error counts associated with storage device 132 are above default thresholds 336, and segregates storage device 132. In some embodiments, expander 140 then transmits storage device placed in segregated zone 604 to storage controller 120, 144. This informs the storage controller 120, 144 that the expander 140 has placed storage device 132 into a segregated zone 424. However, in some embodiments, expander 140 may not transmit storage device placed in segregated zone 604 to storage controller 120, 144, and may instead operate completely autonomously without notifying any other storage controller 120, 144 or administrative computer 116, 136.

In some embodiments, storage controller 120, 144 transmits storage device in segregated zone 608 to administrative computer 116, 136. Administrative computer 116, 136 in some embodiments may log this information, and in other embodiments may indicate to a user or system administrator through a GUI or other user interface that storage device 132 has been placed in a segregated zone 424.

While storage device 132 is within the segregated zone 424, expander 140 conducts various tests to storage device 132, in order to determine if storage device 132 is able to return to normal operation. The tests may include any of monitoring the link to storage device 132 in the absence of any I/O transfers, executing read buffer and/or write buffer commands to storage device 132, or downshifting transmission speed of the link between expander 140 and storage device 132. Other suitable tests may be possible.

If the expander 140 is able to complete the executed tests, expander 140 transmits storage device removed from segregated zone 612 to storage controller 120, 144. This communicates to the storage controller 120, 144 that normal data I/O read and write operations may be resumed to storage device 132, and that storage device 132 will participate in device discovery operations as required.

In some embodiments, storage controller 120, 144 transmits storage device out of segregated zone 616 to administrative computer 116, 136. Administrative computer 116, 136 then displays to a user or system administrator that storage device 132 is not in a segregated zone 424. FIG. 6a is considered the preferred embodiment because segregation decisions do not depend on either storage controller 120, 144 or administrative computer 116, 136. Depending on the behavior of a storage device 132, links 236 and/or 156 may become effectively unusable due to link up/down reporting and broadcast messaging, resulting in storage controller 120, 144 effectively unable to respond to status reporting from expander 140. The embodiments of FIGS. 6a and 6b allow expander 140 to make the initial segregation decision, resulting in clear communication over links 236 and/or 156.

Referring now to FIG. 6b, a block diagram illustrating a data storage system using expander 140 control with storage controller 120, 144 override in accordance with embodiments of the present invention is shown. FIG. 6b is similar to FIG. 6a, but provides the capability for storage controller 120, 144 to override segregation decisions made by expander 140.

After receiving storage device placed in segregated zone 604 from expander 140, storage controller 120, 144 determines the data storage system cannot allow storage device 132 to be placed in a segregated zone 424. One example of why this may be necessary is if storage device 132 is a new type of storage device in the data storage system, and the expander 140 is not been updated with PHY parameters and default thresholds 336 reflecting the new type of storage device. Another example of why this may be necessary is if a RAID-based logical volume includes storage device 132, and the RAID-based logical volume is already in a degraded condition. Logical volumes integrated conditions cannot tolerate loss of another storage device 132, and isolating another storage device 132 may result in loss of data or lack of access to data and the logical volume. After storage controller 120, 144 determines the data storage system cannot allow storage device 132 to be placed in a segregated zone 424, storage controller 120, 144 transmits remove storage device from segregated zone 620 to expander 140. Expander 140 then removes storage device 132 from the segregated zone 424, and responsively transmits storage device removed from segregated zone 612 to storage controller 120, 144.

In some embodiments, storage controller 120, 144 transmits storage device in segregated zone 608 and storage device out of segregated zone 616 to administrative computer 116, 136. Administrative computer 136 may log the data, or display the segregated status of storage device 132 to a user or system administrator.

Referring now to FIG. 6c, a block diagram illustrating a data storage system using expander 140 control with administrative computer 116, 136 override in accordance with embodiments of the present invention are shown. FIG. 6c is similar to FIG. 6b, but provides administrative computer 116, 136 override of segregation decisions by the expander 140 instead of storage controller 120, 144 in FIG. 6b.

After receiving storage device in segregated zone 608 from storage controller 120, 144, administrative computer 116, 136 (or a user or system administrator associated with administrative computer 116, 136) decides to override the segregation decision made by the expander 140. Administrative computer 116, 136 generates a command remove storage device from segregated zone 624 to storage controller 120, 144. In response, storage controller 120, 144 transmits remove storage device from segregated zone 620 to expander 140. Expander 140 then removes storage device 132 from the segregated zone 424, and transmits storage device removed from segregated zone 612 to storage controller 120, 144. Storage controller 120, 144 transmits storage device out of segregated zone 616 to administrative computer 116, 136. As before, administrative computer 116, 136 may display the current state of storage device 132 to a user or system administrator.

Referring now to FIG. 6d, a block diagram illustrating a data storage system using storage controller 120, 144 control in accordance with embodiments of the present invention. This embodiment provides segregation decision making capability in the storage controller 120, 144 instead of the expander 140. The expander 140 therefore reports error counts, test status, and storage device 132 status to storage controller 120, 144.

Expander 140 transmits storage device error counts 628 to storage controller 120, 144. In one embodiment, storage device error counts 628 are transmitted from expander 140 to storage controller 120, 144 each time a new error is detected by expander 140. In another embodiment, storage controller 120, 144 periodically polls expander 140 for error counts 628, and expander 140 responsively provides the current error counts 628 to storage controller 120, 144. Based on the storage device error counts 628, storage controller 120, 144 transmits place storage device into segregated zone 632 to expander 140. Expander 140 then responsively places storage device 132 into a segregated zone 424. Once in the segregated zone 424, storage device 132 is tested by expander 140 in order to determine if storage device 132 is able to resume normal operation. When the test sequence is completed, expander 140 transmits storage device test results 636 to storage controller 120, 144. Based on the storage device test results 636, storage controller 120, 144 may transmit remove storage device from segregated zone 620 to expander 140. In response to receiving remove storage device from segregated zone 620 from storage controller 120, 144, expander 140 removes storage device 132 from the segregated zone 424.

Optionally, storage controller 120, 144 may transmit storage device in segregated zone 608 to administrative computer 116, 136 in order to communicate to a user or system administrator that storage device 132 has been placed in a segregated zone 424. Additionally, storage controller 120, 144 may generate storage device out of segregated zone 616 to administrative computer 116, 136 in order to communicate to a user or system administrator that storage device 132 has been removed from the segregated zone 424.

Referring now to FIG. 6e, a block diagram illustrating a data storage system using storage controller 120, 144 control with administrative computer 116, 136 override in accordance with embodiments of the present invention is shown. The embodiment of FIG. 6e is similar to FIG. 6d, however the embodiment of FIG. 6e provides more information from the storage controller 120, 144 to the administrative computer 116, 136 so that the administrative computer 116, 136 may override segregate/un-segregate decisions made by storage controller 120, 144.

Expander 140 provides storage device error counts 628 to storage controller 120, 144. In response, storage controller 120, 144 provides error counts to administrative computer 640 to administrative computer 116, 136. If storage controller 120, 144 determines the error counts warrant placing the storage device 132 into the segregated zone 424, the storage controller 120, 144 transmits place storage device into segregated zone 632 to expander 140 and transmits storage device in segregated zone 608 to administrative computer 116, 136.

In response to receiving place storage device into segregated zone 632 from storage controller 120, 144, expander 140 places storage device 132 into the segregated zone 424 and begins segregated zone testing of storage device 132. While this is occurring, administrative computer 116, 136 reviews the error counts 640 and may determine the error counts 640 do not warrant placing the storage device 132 into the segregated zone 424. In that case, administrative computer 116, 136 generates a command remove storage device from segregated zone 624 to storage controller 120, 144. In response, storage controller 120, 144 generates remove storage device from segregated zone 620, and expander 140 responsively removes storage device 132 from the segregated zone 424. If administrative computer 116, 136 does not determine the error counts 640 warrant removing the storage device 132 from the segregated zone 424, administrative computer 116, 136 then waits for test results 644.

When expander 140 completes the testing to storage device 132, expander 140 transmits storage device test results 636 to storage controller 120, 144. In response, storage controller 120, 144 transmits test results to administrative computer 644. Based on the test results 644, storage controller 120, 144 may transmit remove storage device from segregated zone 620 to expander 140 and storage device out of segregated zone 616 to administrative computer 116, 136. If the test results 636 did not warrant storage controller 120, 144 removing storage device 132 from the segregated zone 424, it is still possible that administrative computer 116, 136 may override storage controller 120, 144, based on the test results 644. In that case, administrative computer 116, 136 transmits command remove storage device from segregated zone 624 to storage controller 120, 144. In response, storage controller 120, 144 generates remove storage device from segregated zone 620 to expander 140, and expander 140 removes storage device 132 from the segregated zone 424 and transmits storage device removed from segregated zone 612 to storage controller 120, 144. Finally, storage controller 120, 144 transmits storage device out of segregated zone 616 to administrative computer 116, 136.

Referring now to FIG. 6f, a block diagram illustrating a data storage system using administrative computer 116, 136 control in accordance with embodiments of the present invention is shown. FIG. 6f illustrates embodiments where the storage controller 120, 144 passes through error counts and test results between expander 140 and administrative computer 116, 136, and administrative computer 116, 136 or a user/system administrator associated with administrative computer 116, 136 makes segregate/un-segregate decisions for storage device 132.

As in previous embodiments, expander 140 transmits storage device error counts 628 to storage controller 120, 144. In response, storage controller 120, 144 transmits error counts to administrative computer 640 to the administrative computer 116, 136. Based on the error counts 640, administrative computer 116, 136 transmits command place storage device into segregated zone 648 to storage controller 120, 144. Storage controller 120, 144 the responsively transmits place storage device into segregated zone 632 to expander 140, thereby causing expander 140 to place storage device 132 into a segregated zone 424 and initiate segregated zone testing for storage device 132. When expander 140 has completed testing storage device 132, expander 140 transmits storage device test results 636 to storage controller 120, 144. In response, storage controller 120, 144 transmits storage device test results to administrative computer 644 to administrative computer 116, 136.

Based on the test results 644, administrative computer 116, 136 may determine storage device 132 should be removed from the segregated zone 424, and responsively transmits command remove storage device from segregated zone 624 to storage controller 120, 144. In response to receiving a command remove storage device from segregated zone 624 from administrative computer 116, 136, storage controller 120, 144 transmits remove storage device from segregated zone 620 to expander 140. This causes expander 140 to remove storage device 132 from the segregated zone 424.

Referring now to FIG. 7, a flowchart illustrating expander 140 initialization in accordance with embodiments of the present invention is shown. Flow begins at block 704.

At block 704, expander 140 powers-up or is manually reset by storage controller 120, 144. Flow proceeds to block 708.

At block 708, expander 140 reads expander boot code 328 from external non-volatile memory 324, and configures itself. Expander boot code 328 includes initialization diagnostics, default analog PHY settings, and default expander 140 operating parameters. Flow proceeds to block 712.

At block 712, expander 140 reads customer-specific code 332 from external non-volatile memory 324 and configures each PHY 312 with baseline parameters including default error thresholds 336. Default error thresholds 336 are used by expander 140 unless storage controller 120, 144 either updates customer-specific code 332 in external non-volatile memory 324 or overwrites default error thresholds in expander 140. Flow proceeds to block 716.

At block 716, expander 140 performs link training for each associated link, using baseline parameters, to establish initial transmission speed for each link. In some embodiments, the initial transmission speed for a given link will be the maximum transmission speed supported on the given link. In other embodiments, the initial transmission speed for a given link will be the minimum transmission speed supported on the given link. In yet other embodiments, the initial transmission speed for a given link will be an intermediate transmission speed supported on the given link. Flow ends at block 716.

Referring now to FIG. 8, a flowchart illustrating expander 140 control of a segregated zone 424 in accordance with embodiments of the present invention is shown. Flow begins at block 804.

At block 804, the expander 140 detects an error corresponding to the link. Errors corresponding to the link may either be storage device 132 errors, or errors reflecting transmission problems between expander 140 and a storage device 132. Flow proceeds to block 808.

At block 808, expander 140 identifies the type of error. As discussed with respect to FIG. 5, multiple error types are supported by expanders 140 and storage devices 132. Therefore, it is important to identify the type of error that has been detected by expander 140. Flow proceeds to block 812.

At block 812, expander 140 increments an error count corresponding to the type of error in the link. It is expected that multiple error counts will be maintained simultaneously by the expander 140, corresponding to link errors and storage device 132 errors. Flow proceeds to decision block 816.

At decision block 816, the expander 140 determines if the count corresponding to the detected error is above an error threshold 340. The error threshold 340 is specific to the type of error and the link/storage device 132 corresponding to the error. If the error count is not above the corresponding error threshold 340, then flow proceeds to block 804 to detect a next error. If the error count is above the corresponding error threshold 340, then flow proceeds to block 820.

At block 820, the expander 140 places the storage device 132 into a segregated zone 424. In one embodiment, the segregated zone 424 is common for all storage devices 132 in the data storage system. In other embodiments, the segregated zone 424 is unique to either the expander 140 or the storage controller 120, 144. Flow proceeds to optional block 824 and blocks 904 and 908 of FIG. 9.

There are several possible outcomes once a storage device 132 is placed into a segregated zone 424. First, a storage device 132 may remain in the segregated zone 424 because it doesn't pass the tests illustrated in FIG. 9. Second, a storage device 132 may remain in the segregated zone 424 because it doesn't pass other tests as directed by a storage controller 120,144 or administrative computer 116,136. Third, a storage device 132 may remain in the segregated zone 424 because the storage controller 120,144 or administrative computer 116, 136 overrides an expander 140 segregation decision and forces it to remain there (no testing or other action taken). Fourth, a storage device 132 may be removed from the segregated zone 424 because the storage device 132 passes the tests illustrated in FIG. 9. Fifth, a storage device 132 may be removed from the segregated zone 424 because it passes other tests as directed by a storage controller 120,144 or administrative computer 116,136. Sixth, the storage device 132 may be removed from the segregated zone 424 because it a storage controller 120,144 or administrative computer 116,136 overrides a segregation decision, independent of any tests.

Once a storage device 132 is in a segregated zone 242, in some embodiments a storage controller 120, 144 is able to read metadata from storage device 132 using proxy I/O. A newly added storage device 132 may be an important part of a RAID volume, but the storage controller 120, 144 may not have that information available without being able to read metadata off the storage device 132. The storage controller 120, 144 or administrative computer 116,136 through proxy I/O can perform read commands to the storage device 132 in order to determine how important the storage device 132 is to the system. In turn, this knowledge will allow the storage controller 120, 144 to properly raise or lower the error thresholds 248, 340 or test thresholds 252, 344 for the storage device 132 in question. One reason to raise a threshold if it is determined the storage device 132 is a spare; lowering would be done if the storage device 132 was a final critical member of a RAID volume. The storage controller 120, 144 issues a vendor unique "proxy read" command to expander 140, which in turn causes expander 140 to issue a read to storage device 132. The storage device 132 returns requested metadata to storage controller 120, 144 in response to the proxy read request.

In some embodiments, a storage device 132 may be allowed to be written to while in a segregated zone 424. For example, a proxy write could be issued to allow critical storage controller 120, 144 cache/coherency data to be written to the storage device 132 as a means to flush cache, perhaps following a loss of main power to the storage controller 120, 144. However, new data writes received by a storage controller 120, 144 are generally not allowed to be written to any storage devices 132 in a segregated zone 424.

At optional block 824, the expander 140 notifies the storage controller 120, 144 it has placed the storage device 132 into a segregated zone 424. In some embodiments, optional blocks 824 and 828 are not performed if the expander 140 performs no reporting of segregation decisions. Block 824 is illustrated in more detail in FIG. 13a. Flow proceeds to optional block 828.

At optional block 828, the storage controller 120, 144 notifies administrative computer 116, 136 it has placed the storage device 132 into a segregated zone 424. This level of notification allows a user or system administrator associated with administrative computer 116, 136 to be notified of the segregation decision. Block 828 is illustrated in more detail in FIG. 14a. Flow proceeds to blocks 904 and 908 of FIG. 9.

Referring now to FIG. 9, a flowchart illustrating expander 140 link testing in accordance with embodiments of the present invention is shown. Expander 140 link testing is initiated when a storage device 132 is placed into a segregated zone. Expander link testing may be a single test, a group of repeated tests, a group of different tests, or different groups of repeated tests. Flow begins at blocks 904 and 908.

At block 904, the expander 140 monitors the link between the expander 140 and the storage device 132 for a predetermined time period. In one embodiment the predetermined time is one second. In other embodiments, the predetermined time period is less than or more than one second. Flow proceeds to decision block 912.

At block 908, the expander 140 executes a read buffer or write buffer command to the storage device 132. Read buffer and write buffer commands do not alter data stored on physical media of the storage device 132, but instead read or write to a semiconductor buffer of the storage device 132 external to the physical media. Therefore read buffer and write buffer commands do not alter data stored on physical media, and errors detected during read buffer and write buffer commands do not reflect data errors on the physical media of the storage device 132. Flow proceeds to decision block 912.

At decision block 912, the expander 140 determines if an error has been detected. If an error has been detected, then flow proceeds to block 916. If an error has not been detected, then flow proceeds to decision block 924.

At block 916, the expander 140 identifies the type of error that has been detected. As stated previously, the error may be one of several types of errors, including CRC errors. Flow proceeds to block 920.

At block 920, the expander 140 increments a test count corresponding to the type of error and the link. The test counts of block 920 are different and independent from the error counts of blocks 804-816, 1104-1120, and 1204-1224. Flow proceeds to decision block 924.

At decision block 924, the expander 140 determines if the end of the tests has been reached. If the end of the tests has not been reached, then flow proceeds to blocks 904 and 908 to continue the tests. If the end of the tests has been reached, then flow proceeds to decision block 928.

At decision block 928, the expander 140 determines if the test count is above a test count threshold 344. The test count represents the number of errors detected during the testing steps in blocks 904-924. The test count threshold 344 is stored within default thresholds 336 in customer-specific code 332. If the test count is not above the test count threshold 344, then flow proceeds to block 932. If the test count is above the test count threshold 344, then flow proceeds to decision block 940.

At block 932, the expander 140 resets both the error count and the test count corresponding to the link and the storage device 132 that was undergoing testing. Flow proceeds to block 936.

At block 936, the expander 140 removes the storage device 132 from the segregated zone 424. At this point, the storage device 132 returns to normal operation. During normal operation, data reads and data writes are made to storage device 132 by storage controller 120, 144, and storage device 132 is allowed to participate in device discovery processes. Flow proceeds to block 804 of FIG. 8 to detect errors in normal operation.

At decision block 940, the storage device 132 and corresponding link have failed the test process and the expander 140 determines if a lower link transmission speed is available. If the current link transmission speed is 6 MB/s and the link supports 3 MB/s operation, a lower link transmission speed is available. If the current link transmission speed is 3 MB/s and the link supports only 3 MB/s and 6 MB/s transmission speeds, no lower link transmission speeds are available. If a lower link transmission speed is not available, then flow proceeds to blocks 1004, 1008, and 1016 of FIG. 10. If a lower link transmission speed is available, then flow proceeds to block 944.

At block 944, the expander 140 reduces the link transmission speed to the next lower supported link transmission speed. Sometimes, when link testing fails a given link transmission speed, it may pass at a lower link transmission speed. Flow proceeds to block 948.

At block 948, the expander 140 resets the test count, in preparation for restarting the storage device 132 when corresponding link tests. Flow proceeds to blocks 904 and 908 to restart the tests.

Referring now to FIG. 10, a flowchart illustrating expander 140 link testing failure in accordance with embodiments of the present invention is shown. Flow begins at blocks 1004, 1008, and 1016. FIG. 10 is invoked in the link testing process whenever the tests have failed, and no lower link transmission speeds are available to the expander 140. It should be understood that blocks 1004, 1008, and 1016 are alternatives that may be executed by expander 140, depending on system objectives. Therefore, only one of blocks 1004, 1008, and 1016 are executed in any embodiment of expander 140 link testing failure.

At block 1004, the storage device 132 remains in the segregated zone 424 until the expander 140 receives a command from the storage controller 120, 144 to remove storage device 132 from the segregated zone 424. In some embodiments, the storage controller 120, 144 may elect to take storage device 132 out of segregated zone 424 after some period of time has elapsed. In other embodiments, the storage controller 120, 144 may elect to take storage device 132 out of segregated zone 424 after storage device 132 has been replaced. Flow ends at block 1004.

At block 1008, expander 140 notifies the storage controller 120, 144 that the storage device 132 fails segregated zone 424 tests at the lowest supported link transmission speed. Flow proceeds to block 1012.

At block 1012, storage controller 120, 144 commands expander 140 to power-down storage device 132. Flow proceeds to block 1016.

At block 1016, expander 140 powers down storage device 132, and notifies storage controller 120, 144 that storage device 132 has been powered-down. Flow proceeds to block 1020.

At block 1020, storage controller 120, 144 notifies an administrative computer 116, 136 that storage device 132 has been powered-down. Flow proceeds to block 1024.

At block 1024, administrative computer 116, 136 notifies a user or system administrator that the storage device 132 has been powered-down, and provides recommended action to the user or system administrator. Notification is typically provided by a graphical user interface (GUI), although a notification may be posted to a log or provided in some other fashion. The recommended action may take several forms, depending on system objectives. In one embodiment, the recommended action may to be to replace the storage device 132. In yet another embodiment, the recommended action may be to check the type, model number, or serial number of storage device 132 and compare to an approved storage device 132 list. Flow ends at block 1024.

Referring now to FIG. 11, a flowchart illustrating storage controller 120, 144 control of a segregated zone 424 in accordance with embodiments of the present invention is shown. The embodiment of FIG. 11 is an alternative to the embodiment of FIG. 8, and may be more desirable for data storage systems with simplified expander 140 functionality. Flow begins at block 1104.

At block 1104, expander 140 detects an error corresponding to the link. The error may correspond to a storage device 132 attached to the link, or the link itself. Flow proceeds to block 1108.

At block 1108, expander 140 notifies storage controller 120, 144 about the error corresponding to the link. Flow proceeds to block 1112.

At block 1112, storage controller 120, 144 identifies the type of error corresponding to the link. Flow proceeds to block 1116.

At block 1116, storage controller 120, 144 increments an error count corresponding to the type of error and the link. Therefore, for each link attached to expander 140, storage controller 120, 144 maintains separate error counts for each type of error. Flow proceeds to decision block 1120.

At decision block 1120, storage controller 120, 144 determines if the error count is above an error threshold 248. The error threshold 248 is stored in revised thresholds 244 in storage controller memory 208. If the error count is not above the error threshold 248, then flow proceeds to block 1104 to wait for the next error reported by expander 140. If the error count is above the error threshold 248, then flow proceeds to block 1124.

At block 1124, storage controller 120, 144 sends a command to expander 140 to place the storage device 132 into a segregated zone 424. Flow proceeds to block 1128.

At block 1128, expander 140 places the storage device 132 into a segregated zone 424. At this point segregated zone 424 testing is initiated and flow proceeds to optional block 1132 and blocks 904 and 908 of FIG. 9.

At optional block 1132, storage controller 120, 144 notifies administrative computer 116, 136 it has placed storage device 132 into a segregated zone 424. Notification of administrative computer 116, 136 is optional. It is desirable if users or system administrators need to be informed of the segregation status of each storage device 132. Block 1132 is illustrated in more detail in FIG. 14a. Flow proceeds to blocks 904 and 908 of FIG. 9.

In some embodiments, storage controller 120, 144 issues commands to expander 140, reflecting either segregation decisions made by storage controller 120, 144 (FIG. 11), or storage controller 120, 144 override of expander 140 segregation decisions (FIG. 13a). The commands issued by storage controller 120, 144 include, but are not limited to:
  Issue proxy read
  Issue proxy write
  Perform read test
  Perform write test
  Perform action, where action is defined as:
    power cycle storage device 132
    change PHY parameters
    change other low level settings
  Get statistics returns error counts 628
  Get/Set slot speed returns transmission speed
  Get/Set entry threshold (sets error thresholds 248, 340)
  Get/Set override includes:
    override for automatic testing to not be initiated
    storage device 132 to remain in segregated zone 424 regardless of testing outcome
    force a storage device 132 into a segregated zone 424
    force a storage device 132 out of a segregated zone 424
    turn off segregated zone 424 checks
  Get/Set parameter includes:
    number of read/write PO's to issue
    number of retries to issue
    number of times to loop/repeat specified tests Referring now to FIG. 12, a flowchart illustrating administrative computer 116, 136 control of a segregated zone 424 in accordance with embodiments of the present invention is shown. The embodiment of FIG. 12 is an alternative to the embodiment of FIGS. 8 and 11, and may be more desirable for data storage systems with simplified expander 140 and storage controller 120, 144 functionality. Flow begins at block 1204.

At block 1204, expander 140 detects an error corresponding to the link. The error may correspond to a storage device 132 attached to the link, or the link itself. Flow proceeds to block 1208.

At block 1208, expander 140 notifies storage controller 120, 144 about the error corresponding to the link. Flow proceeds to block 1212.

At block 1212, the storage controller 120, 144 notifies administrative computer 116, 136 about the error corresponding to the link. Flow proceeds to block 1216.

At block 1216, administrative computer 116, 136 identifies the type of error corresponding to the link. Flow proceeds to block 1220.

At block 1220, administrative computer 116, 136 increments an error count corresponding to the type of error and the link. Therefore, for each link attached to expander 140, administrative computer 116, 136 maintains separate error counts for each type of error. Flow proceeds to decision block 1224.

At decision block 1224, administrative computer 116, 136 determines if the error count is above an error threshold 248. The error threshold 248 is stored in revised thresholds 244 in administrative computer memory 208. If the error count is not above the error threshold 248, then flow proceeds to block 1204 to wait for the next error reported by expander 140. If the error count is above the error threshold 248, then flow proceeds to block 1228.

At block 1228, administrative computer 116, 136 sends a command to storage controller 120, 144 to place the storage device 132 into a segregated zone 424. Flow proceeds to block 1232.

At block 1232, storage controller 120, 144 sends a command to expander 140 to place the storage device 132 into a segregated zone 424. Flow proceeds to block 1236.

At block 1236, expander 140 places the storage device 132 into a segregated zone 424. At this point segregated zone 424 testing is initiated and flow proceeds to blocks 904 and 908 of FIG. 9.

In some embodiments, administrative computer 116, 136 issues commands to expander 140, reflecting either segregation decisions made by administrative computer 116, 136 (FIG. 12), or administrative computer 116, 136 override of expander 140 segregation decisions (FIG. 14a). The commands issued by administrative computer 116, 136 include, but are not limited to:
  Issue proxy read
  Issue proxy write
  Perform read test
  Perform write test
  Perform action, where action is defined as:
    power cycle storage device 132
    change PHY parameters
    change other low level settings
  Get statistics returns error counts 628
  Get/Set slot speed returns transmission speed
  Get/Set entry threshold (sets error thresholds 248, 340)
  Get/Set override includes:
    override for automatic testing to not be initiated
    storage device 132 to remain in segregated zone 424 regardless of testing outcome
    force a storage device 132 into a segregated zone 424
    force a storage device 132 out of a segregated zone 424
    turn off segregated zone 424 checks
  Get/Set parameter includes:
    number of read/write PO's to issue
    number of retries to issue
    number of times to loop/repeat specified tests Referring now to FIG. 13a, a flowchart illustrating storage controller 120, 144 override of expander 140 segregation in accordance with embodiments of the present invention is shown. FIG. 13a is invoked within block 824 of FIG. 8. Flow begins at block 1304.

At block 1304, storage controller 120, 144 receives notification from expander 140 that expander 140 has placed a storage device 132 into a segregated zone 424. Flow proceeds to block 1308 and decision block 1324.

At block 1308, storage controller 120, 144 obtains error counts 628 from expander 140. Flow proceeds to block 1312.

At block 1312, for each error count 628, storage controller 120, 144 identifies the type of error corresponding to the error count 628. Flow proceeds to block 1316.

At block 1316, storage controller 120, 144 compares each identified error count 628 to one or more revised error thresholds 248 stored in storage controller 120, 144. Flow proceeds to decision block 1320.

At decision block 1320, the storage controller 120, 144 determines if any error counts 628 are above revised error thresholds 248 stored in storage controller 120, 144. If any error counts 628 are above revised error thresholds 248 stored in storage controller 120, 144, then storage controller 120, 144 has determined that storage device 132 has experienced a sufficient number of errors to be placed in a segregated zone 424, no segregation override occurs, and flow proceeds to block 828 of FIG. 8. If no error counts 628 are above revised error thresholds 248 stored in storage controller 120, 144, then storage controller 120, 144 has determined that storage device 132 has not experienced a sufficient number of errors to be placed in a segregated zone 424, storage device 132 is to be removed from the segregated zone 424, and flow proceeds to block 1328.

At decision block 1324, storage controller 120, 144 determines if any other override conditions have been met. Other override conditions include, but are not limited to the logical volume including storage device 132 is already in a critical state, and removing storage device 132 from normal operation by placing into a segregated zone 424 may result in loss of data or data corruption. If the storage controller 120, 144 determines that one or more other override conditions have been met, then flow proceeds to block 1328. If the storage controller 120, 144 does not determine that one or more other override conditions have been met, then an override of a segregation decision by expander 140 is not required, and flow proceeds to block 828 of FIG. 8.

At block 1328, storage controller 120, 144 sends a command 620 to the expander 140 to remove storage device 132 from a segregated zone 424. This directs the expander 140 to remove storage device 132 from a segregated zone 424, provided storage device 132 is already in a segregated zone 424. Flow proceeds to block 1332.

At block 1332, expander 140 removes storage device 132 from segregated zone 424. Flow ends at block 1332.

Referring now to FIG. 13b, a flowchart illustrating storage controller 120, 144 segregation not based on error counts in accordance with embodiments of the present invention is shown. FIG. 13b is invoked at any time, depending on when storage controller 120, 144 detects a condition requiring storage device 132 to be placed into a segregated zone 424, regardless of error counts. Flow begins at block 1336.

At block 1336, storage controller 120, 144 detects a condition requiring storage device 132 to be placed into a segregated zone 424. In one embodiment, the condition requiring storage device 132 to be placed into a segregated zone 424 is where storage controller 120, 144 detects storage device 132 is not an approved storage device, and may not work reliably. In that case, placing storage device 132 into a segregated zone advantageously keeps storage device 132 from storing user data or participating in device discovery processes. In another embodiment, storage controller 120, 144 places storage device 132 into a segregated zone 424 after it is determined a computer virus is present in storage controller 120, 144, or a computer in data storage system 100, 104, 108, or 112, including administrative computer 116, 136. In another embodiment, storage controller 120, 144 or a computer in data storage system 100, 104, 108, or 112, including administrative computer 116, 136 determines data to be written to storage device 132 includes at least a portion of a computer virus. Flow proceeds to block 1340.

At block 1340, storage controller 120, 144 sends a command 632 to expander 140 to place storage device 132 into a segregated zone 424. Flow proceeds to optional block 1344 and block 1348.

At optional block 1344, storage controller 120, 144 notifies administrative computer 116, 136 it has placed storage device 132 into a segregated zone 424. Administrative computer 116, 136 may provide a textual or other visual notification to a user or system administrator that storage device 132 has been placed into a segregated zone 424, and/or an event may be logged on the administrative computer 116, 136. Flow ends at optional block 1344.

At block 1348, expander 140 places storage device 132 into a segregated zone 424. Since the override process of FIG. 13b is not invoked based on error counts 628, it is unlikely for expander 140 to initiate the test process of FIG. 9. Instead, a user or system administrator may take some action possibly including removing or replacing storage device 132. Flow ends at block 1348.

Referring now to FIG. 14a, a flowchart illustrating administrative computer 116, 136 override of expander 140 segregation in accordance with embodiments of the present invention is shown. Flow begins at block 1404.

At block 1404, administrative computer 116, 136 receives notification from storage controller 120, 144 that expander 140 has placed a storage device 132 into a segregated zone 424. Flow proceeds to block 1408 and decision block 1424.

At block 1408, administrative computer 116, 136 obtains error counts 640 from storage controller 120, 144. Flow proceeds to block 1412.

At block 1412, for each error count 640, administrative computer 116, 136 identifies the type of error corresponding to the error count 640. Flow proceeds to block 1416.

At block 1416, administrative computer 116, 136 compares each identified error count 640 to one or more revised error thresholds 248 stored in administrative computer 116, 136. Flow proceeds to decision block 1420.

At decision block 1420, administrative computer 116, 136 determines if any error counts 640 are above revised error thresholds 248 stored in administrative computer 116, 136. If any error counts 640 are above revised error thresholds 248 stored in administrative computer 116, 136, then administrative computer 116, 136 has determined that storage device 132 has experienced a sufficient number of errors to remain in segregated zone 424, no segregation override occurs, and flow proceeds to blocks 904 and 908 of FIG. 9. If no error counts 640 are above revised error thresholds 248 stored in storage controller 120, 144, then storage controller 120, 144 has determined that storage device 132 has not experienced a sufficient number of errors to be placed in a segregated zone 424, storage device 132 is to be removed from the segregated zone 424, and flow proceeds to block 1428.

At decision block 1424, administrative computer 116, 136 determines if any other override conditions have been met. Other override conditions include, but are not limited to the logical volume including storage device 132 is already in a critical state, and removing storage device 132 from normal operation by placing into a segregated zone 424 may result in loss of data or data corruption. If the administrative computer 116, 136 determines that one or more other override conditions have been met, then flow proceeds to block 1428. If the administrative computer 116, 136 does not determine that one or more other override conditions have been met, then an override of a segregation decision by expander 140 or storage controller 120, 144 is not required, and flow proceeds to blocks 904 and 908 of FIG. 9.

At block 1428, administrative computer 116, 136 sends a command 624 to storage controller 120, 144 to remove storage device 132 from segregated zone 424. This directs the storage controller 120, 144 to remove storage device 132 from a segregated zone 424, provided storage device 132 is already in a segregated zone 424. Flow proceeds to block 1432.

At block 1432, storage controller 120, 144 sends a command 620 to the expander 140 to remove storage device 132 from a segregated zone 424. This directs the expander 140 to remove storage device 132 from a segregated zone 424, provided storage device 132 is already in a segregated zone 424. Flow proceeds to block 1436.

At block 1436, expander 140 removes storage device 132 from segregated zone 424. Flow ends at block 1436.

Referring now to FIG. 14b, a flowchart illustrating administrative computer 116, 136 segregation not based on error counts in accordance with embodiments of the present invention is shown. FIG. 14b is invoked at any time, depending on when administrative computer 116, 136 detects a condition requiring storage device 132 to be placed into a segregated zone 424, regardless of error counts. Flow begins at block 1440.

At block 1440, administrative computer 116, 136 detects a condition requiring storage device 132 to be placed into a segregated zone 424. In one embodiment, the condition requiring storage device 132 to be placed into a segregated zone 424 is where administrative computer 116, 136 detects storage device 132 is not an approved storage device, and may not work reliably. In that case, placing storage device 132 into a segregated zone 424 will keep storage device 132 from storing user data or participating in device discovery processes. In another embodiment, administrative computer 116, 136 places storage device 132 into a segregated zone 424 after it is determined a computer virus is present in storage controller 120, 144, or a computer in data storage system 100, 104, 108, or 112, including administrative computer 116, 136. In another embodiment, storage controller 120, 144 or a computer in data storage system 100, 104, 108, or 112, including administrative computer 116, 136 determines data to be written to storage device 132 includes at least a portion of a computer virus. Flow proceeds to block 1444.

At block 1444, administrative computer 116, 136 sends a command 648 to storage controller 120, 144 to place storage device 132 into a segregated zone 424. Flow proceeds to block 1448.

At block 1448, storage controller 120, 144 sends a command 632 to expander 140 to place storage device 132 into a segregated zone 424. Flow proceeds to optional block 1452 and block 1456.

At optional block 1452, storage controller 120, 144 notifies administrative computer 116, 136 it has placed storage device 132 into a segregated zone 424. Administrative computer 116, 136 may provide a textual or other visual notification to a user or system administrator that storage device 132 has been placed into a segregated zone 424, and/or an event may be logged on the administrative computer 116, 136. Flow ends at optional block 1452.

At block 1456, expander 140 places storage device 132 into a segregated zone 424. Since the override process of FIG. 14b is not invoked based on error counts 628, it is unlikely for expander 140 to initiate the test process of FIG. 9. Instead, a user or system administrator may take some action possibly including removing or replacing storage device 132. Flow ends at block 1456.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A method for maintaining reliable communication on a link between an expander and a storage device, comprising:
    detecting, by a processor coupled to the link, an error corresponding to the link;
    maintaining, by the processor, a count of detected errors for the link; and
    determining, by the processor, if the count of detected errors is above a first error threshold;
        if the count of detected errors is not above the first error threshold, then repeating detecting, maintaining, and determining; and
        if the count of detected errors is above the first error threshold, then placing, by the processor, the storage device into a segregated zone,
    wherein placing the storage device into the segregated zone comprises:
        suspending data reads and writes to the storage device;
        preventing participation by the storage device in device discovery processes; and
        testing, by the processor, the link, wherein testing the link comprises at least one of:
            monitoring the link for a predetermined time period;
            downshifting the link to a next lower transmission speed, if a lower transmission speed is available;
            performing at least one of read buffer commands and write buffer commands to the storage device; and
            detecting CRC errors on the link while monitoring the link and performing at least one of read buffer commands and write buffer commands to the storage device.

2. The method of claim 1, wherein if the processor determines the CRC errors are above a second threshold, the processor repeats performing, detecting and calculating, wherein if the CRC errors are not above the second threshold, integrating the link, by the processor.

3. The method of claim 2, wherein integrating the link comprises returning the link to regular operation, wherein regular operation comprises allowing data reads and writes to the storage device and allowing the storage device to participate in device discovery processes.

4. The method of claim 3, wherein at least one of a controller and an administrative computer updates at least one of the first and second thresholds, wherein the controller and administrative computer are coupled to the processor.

5. The method of claim 1, wherein after placing the storage device into the segregated zone the method further comprising:
    notifying, by the processor, a controller coupled to the processor that the link is above the first error threshold.

6. The method of claim 5, wherein after notifying the controller that the link is above the first error threshold, the method further comprising:
    transferring, by the controller, an indication to an administrative computer coupled to the controller that the storage device is in the segregated zone; and
    displaying, by the administrative computer, the storage device in the segregated zone to a user.

7. The method of claim 6, wherein after displaying the storage device in the segregated zone to the user, the method further comprising:
    receiving, by the administrative computer, a user indication to override segregating the storage device;
    generating, by the administrative computer, a command to the controller to override segregating the storage device;
    transferring a message by the controller to the processor to override segregating the storage device; and
    removing, by the processor, the storage device from the segregated zone.

8. A system for maintaining reliable communication on a link between an expander and a storage device, comprising:
    a processor;

the storage device; and the link, coupled to the processor and the storage device, wherein the processor detects an error corresponding to the link, maintains a count of detected errors for the link, and determines if the count of detected errors is above a first error threshold, wherein if the count of detected errors is not above the first error threshold, the processor repeats detects, maintains, and determines, wherein if the count of detected errors is above the first error threshold, then the processor places the storage device into a segregated zone, wherein the processor places the storage device into the segregated zone comprises the processor suspends data reads and writes to the storage device, the processor prevents participation by the storage device in device discovery processes, and the processor tests the link, wherein the processor tests the link comprises at least one of the processor monitors the link for a predetermined time period, the processor downshifts the link to a next lower transmission speed, if a lower transmission speed is available, the processor performs at least one of read buffer commands and write buffer commands to the storage device, and the processor detects CRC errors on the link while the processor monitors the link and performs at least one of read buffer commands and write buffer commands.

9. The system of claim 8, wherein if the processor determines the CRC errors are above a second threshold, the processor continues to test the link, wherein if the CRC errors are not above the second threshold, the processor integrates the link.

10. The system of claim 9, wherein the processor integrates the link comprises the processor returns the link to regular operation, wherein regular operation comprises the processor resumes data reads and writes to the storage device.

11. The system of claim 8, wherein the count of detected errors comprises at least one or more of an error count from the storage device, an error count from the expander, and CRC errors corresponding to the link.

12. The system of claim 8, wherein after the processor places the storage device into the segregated zone, the processor notifies a controller coupled to the processor that the link is above the first error threshold.

13. The system of claim 12, wherein after the processor notifies the controller, the controller transfers an indication to an administrative computer coupled to the controller that the storage device is in the segregated zone and the administrative computer displays the storage device in the segregated zone to a user.

14. The system of claim 13, wherein after the administrative computer displays the storage device in the segregated zone to the user, the administrative computer receives a user indication to override segregating the storage device;

in response to the administrative computer user receives the user indication to override segregating the storage device, the administrative computer generates a command to the controller to override segregating the storage device, the controller transfers a message o the processor to override segregating the storage device, and the processor removes the storage device from the segregated zone.

15. A method for maintaining reliable communication on a link between an expander and a storage device, comprising:
   detecting, by a processor coupled to the link, an error corresponding to the link;
   providing, by the processor, an indication of the error corresponding to the link to a controller coupled to the processor;
   maintaining, by the controller, a count of detected errors for the link; and
   determining, by the controller, if the count of detected errors is above a first error threshold;
   if the count of detected errors is not above the first error threshold, then repeating detecting, providing, maintaining, and determining; and
   if the count of detected errors is above the first error threshold, then:
      transferring, by the controller, a command to the processor to place the storage device into a segregated zone; and
      placing, by the processor, the storage device into the segregated zone,
   wherein placing the storage device into the segregated zone comprises:
      suspending data reads and writes to the storage device;
      allowing metadata reads by the controller in order to determine if the storage device is part of a RAID volume;
      foregoing participation by the storage device in device discovery processes; and
      testing, by the processor, the link, wherein testing the link comprises the controller directing the processor to perform at least one of:
         monitoring the link for a predetermined time period;
         performing at least one of read buffer commands and write buffer commands to the storage device; and
         detecting CRC errors on the link while monitoring the link and performing at least one of read buffer commands and write buffer commands to the storage device.

16. The method of claim 15, wherein in response to testing the link, the method further comprising:
   generating, by the processor, test results to the controller; and
   ascertaining, by the controller, if the test results indicate errors are above a second threshold;
   if the errors are above the second threshold:
      commanding, by the controller, the processor to repeat monitoring, performing, and detecting; and
   if the errors are not above the second threshold:
      commanding, by the controller, the processor to integrate the link; and
      integrating the link, by the processor.

17. The method of claim 16, wherein integrating the link comprises returning the link to regular operation, wherein regular operation comprises resuming data reads and writes to the storage device.

* * * * *